(12) United States Patent
Igura

(10) Patent No.: US 10,359,503 B2
(45) Date of Patent: Jul. 23, 2019

(54) POSITION ESTIMATION APPARATUS, POSITION ESTIMATION SYSTEM, POSITION ESTIMATION METHOD AND RECORDING MEDIUM FOR POSITION ESTIMATION

(71) Applicant: NEC Corporation, Minato-ku, Tokyo (JP)

(72) Inventor: Hiroyuki Igura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 15/544,318

(22) PCT Filed: Feb. 3, 2016

(86) PCT No.: PCT/JP2016/000547
§ 371 (c)(1),
(2) Date: Jul. 18, 2017

(87) PCT Pub. No.: WO2016/125489
PCT Pub. Date: Aug. 11, 2016

(65) Prior Publication Data
US 2018/0267137 A1  Sep. 20, 2018

(30) Foreign Application Priority Data

Feb. 3, 2015 (JP) ................ 2015-019558

(51) Int. Cl.
*H04W 24/00* (2009.01)
*G01S 5/14* (2006.01)
(Continued)

(52) U.S. Cl.
CPC .............. *G01S 5/14* (2013.01); *G01S 5/0289* (2013.01); *H04W 64/00* (2013.01); *H04W 84/18* (2013.01)

(58) Field of Classification Search
CPC ......... H04W 84/18; H04W 64/00; G01S 5/14; G01S 5/0289
(Continued)

(56) References Cited

U.S. PATENT DOCUMENTS 6,950,661 B2 * 9/2005 Watanabe ............... G01S 1/022
342/126
7,409,187 B2 * 8/2008 Taniguchi ............... G01S 19/48
342/457

(Continued)

FOREIGN PATENT DOCUMENTS

CN       102300209 A    12/2011
EP       1617601 A2     1/2006
(Continued)

OTHER PUBLICATIONS

International Search Report for PCT Application No. PCT/JP2016/000547, dated May 10, 2016.
(Continued)

*Primary Examiner* — Marceau Milord

(57) ABSTRACT

The present invention provides a position estimation apparatus, a position estimation system, and a position estimation method that can estimate, with high accuracy, the position of a wireless device, the position of which is unknown, as well as a recording medium for position estimation. The position estimation apparatus comprises: a data collection means for collecting measurement data related to an inter-device distance between one wireless device and another wireless device, the inter-device distance being measured by the one wireless device, and measurement data related to the reliability of the inter-device distance between the one wireless device and the other wireless device, the reliability being calculated by the one wireless device; and a wireless-device position estimation means for estimating the position of a wireless device, the position of which is unknown, on the (Continued)

basis of the measurement data collected by the data collection means and the previously collected measurement data related to the measured inter-device distance between the one wireless device and the other wireless device, and the reliability of the inter-device distance.

9 Claims, 17 Drawing Sheets

(51) Int. Cl.
*H04W 64/00* (2009.01)
*G01S 5/02* (2010.01)
*H04W 84/18* (2009.01)

(58) Field of Classification Search
USPC ............................... 455/456.1, 456.2, 456.3
See application file for complete search history.

(56) References Cited

U.S. PATENT DOCUMENTS

| | | | | |
|---|---|---|---|---|
| 7,702,338 B2* | 4/2010 | Wengler | | G01S 5/0236 |
| | | | | 342/357.31 |
| 7,751,827 B2* | 7/2010 | Poykko | | G01S 5/0252 |
| | | | | 455/456.1 |
| 8,447,324 B2* | 5/2013 | Shuman | | G06F 17/30041 |
| | | | | 455/456.1 |
| 8,787,944 B2* | 7/2014 | Smith | | H04W 4/029 |
| | | | | 455/456.6 |
| 8,792,576 B2* | 7/2014 | Kuwahara | | H04L 25/03891 |
| | | | | 375/267 |
| 9,232,354 B2* | 1/2016 | Smith | | H04W 4/029 |
| 9,246,528 B2* | 1/2016 | Yin | | H04B 1/10 |
| 9,332,386 B2* | 5/2016 | Smith | | H04W 4/029 |
| 9,609,616 B2* | 3/2017 | Smith | | H04W 4/029 |
| 9,877,299 B2* | 1/2018 | Smith | | H04W 4/029 |
| 10,045,153 B2* | 8/2018 | Smith | | G01S 5/0072 |
| 2002/0132625 A1* | 9/2002 | Ogino | | G01S 1/022 |
| | | | | 455/456.2 |
| 2005/0233748 A1 | 10/2005 | Robinson et al. | | |
| 2007/0159986 A1 | 7/2007 | Park et al. | | |
| 2008/0125161 A1 | 5/2008 | Ergen et al. | | |
| 2008/0232281 A1 | 9/2008 | Pahlavan et al. | | |
| 2010/0248637 A1 | 9/2010 | Sahinoglu et al. | | |
| 2011/0059752 A1 | 3/2011 | Garin et al. | | |
| 2017/0055128 A1* | 2/2017 | Smith | | H04W 4/029 |
| 2017/0164315 A1* | 6/2017 | Smith | | H04W 4/029 |
| 2017/0180938 A1* | 6/2017 | Smith | | H04W 4/023 |
| 2017/0238136 A1* | 8/2017 | Smith | | H04W 4/029 |
| | | | | 455/456.3 |

FOREIGN PATENT DOCUMENTS

| | | |
|---|---|---|
| JP | H01-023184 A | 1/1989 |
| JP | 3165391 B2 | 5/2001 |
| JP | 2002-228735 A | 8/2002 |
| JP | 3393417 B2 | 4/2003 |
| JP | 3629370 B2 | 3/2005 |
| JP | 2006-287897 A | 10/2006 |
| JP | 5020411 B2 | 9/2012 |
| JP | 2013-504760 A | 2/2013 |
| WO | 2016/038881 A1 | 3/2016 |

OTHER PUBLICATIONS

English translation of Written opinion for PCT Application No. PCT/JP2016/000547.

* cited by examiner

POSITION ESTIMATION APPARATUS, POSITION ESTIMATION SYSTEM, POSITION ESTIMATION METHOD AND RECORDING MEDIUM FOR POSITION ESTIMATION

This application is a National Stage Entry of PCT/JP2016/000547 filed on Feb. 3, 2016, which claims priority from Japanese Patent Application 2015-019558 filed on Feb. 3, 2015, the contents of all of which are incorporated herein by reference, in their entirety.

TECHNICAL FIELD

The present invention relates to a position estimation apparatus, a position estimation system, a position estimation method, and a recording medium for position estimation, and particularly, relates to estimation of a position of each wireless device, based on an inter-device distance estimated from a radio wave propagation time between a plurality of wireless devices.

BACKGROUND ART

Position information is used in a wide range of fields, such as a navigation system and a map information service. Most famous systems as a means for acquiring position information include a Global Positioning System (GPS).

In the GPS, radio waves transmitted from a plurality of GPS satellites are received by one receiver, and a position of a reception device is estimated from a time difference in arrival of the radio waves. Each of the GPS satellites is equipped with an atomic clock in order to accurately obtain an arrival time difference of radio waves, and further, radio waves can be transmitted with accurate timing by correcting the atomic clock regularly. However, generally, such an accurate clock is extremely expensive and is difficult to be equipped on a terminal side in terms of cost.

Patent literatures 1 to 6 (PTL1 to PTL6) disclose techniques of estimating a position of a wireless device that constitutes a wireless network system.

Techniques disclosed in PTL1 and PTL2 are for estimating a position of a mobile station by using a reception delay time of radio waves in a mobile communication system. In the technique in PTL1, a position is estimated by using an arrival time difference of radio waves from a plurality of base stations. In addition, in the technique in PTL2, a position of a mobile station is calculated by measuring a delay time of radio waves from a mobile station, the position of which is desired to obtain, to a plurality of base station antennas disposed in a periphery of a zone.

PTL3 discloses a technique of estimating a position of a mobile station by measuring received radio wave intensity from a plurality of base stations. A method of estimating a position by using radio wave intensity has an advantage of being low in cost in comparison with other methods. However, since the radio wave intensity is largely affected by am ambient environment, the method also has a problem of being extremely low in position estimation accuracy. PTL3 improves, by using a neural network, the problem of being low in position estimation accuracy in the method of estimating a position by use of radio wave intensity.

PTL4 discloses a method of estimating each position of a plurality of sensor nodes from a result of measuring a distance between the sensor nodes. The technique disclosed in PTL4 uses a method of enhancing accuracy of overall position information by eliminating a low-reliability location estimation value by obtaining, from a distance measurement result, an angle between position-known anchor nodes and comparing the angle with a predetermined threshold value.

PTL5 is a technique related to a wireless device capable of autonomously estimating a position of a wireless device that constitutes a wireless ad-hoc network. According to PTL5, a wireless device determines an own position by autonomously correcting a temporary own position in sequence, in such a way that a computed distance computed based on the temporary own position and a temporary position of a neighboring wireless device approaches a measured distance between the own and the neighboring wireless device.

PTL6 discloses a distance measurement method based on a direct spread spectrum scheme.

CITATION LIST

Patent Literature

[PTL1] Japanese Patent No. 3393417
[PTL2] Japanese Patent No. 3629370
[PTL3] Japanese Patent No. 3165391
[PTL4] Japanese Patent No. 5020411
[PTL5] Japanese Patent Application Laid-open No. 2006-287897
[PTL6] Japanese Patent Application Laid-open No. Hei1-23184

SUMMARY OF INVENTION

Technical Problem

However, the above-described position estimation apparatus has a problem as follows.

When a positional relationship between wireless devices is estimated by using radio wave propagation delay in wireless communication, the techniques disclosed in PTL1 and PTL2 are methods of estimating a position of a position-unknown mobile station by estimating a distance from a position-known base station. Thus, it is difficult to use the techniques for position estimation using communication distance measurement between position-unknown wireless devices. In addition, since only information on a distance from a position-known base station is used, there is a case in which a large estimation error may occur.

PTL3 is for improving, by using a neural network, the problem of being low in position estimation accuracy in the method of estimating a position by use of radio wave intensity. However, the method of estimating a position by use of radio wave intensity, even when improvement is added, still remains low in position estimation accuracy in comparison with position estimation using a delay time difference or an arrival direction of radio waves.

In the technique disclosed in PTL4, position estimation accuracy of a position-unknown target node is verified, and thereafter the target node is converted into a position-known anchor node. Thus, the technique can be used for position estimation using communication distance measurement between position-unknown wireless devices. However, in the technique disclosed in PTL4, no consideration is given to a difference in reliability included in an individual distance measurement value. Thus, the technique has a problem of being unable to perform accuracy improvement owing to measurement of a difference in a communication environment or quality of a communication path.

In the technique disclosed in PTL5, position estimation accuracy is enhanced by repeating re-measurement. However, also in this technique, no consideration is given to reliability in distance measurement between wireless devices and reliability of a position at a time of temporary position estimation. Thus, the technique has a problem of being unable to perform accuracy improvement owing to measurement of a difference in a communication environment or quality of a communication path.

The technique disclosed in PTL6 can be used for distance measurement between wireless devices, but there is no description related to estimation of a position of a wireless device.

An object of the present invention is to provide a position estimation apparatus, a position estimation system, a position estimation method, and a recording medium for position estimation that can estimate a position with high accuracy, for use in grasping a relative positional relationship through mutual wireless communication of wireless devices.

Solution to Problem

To achieve the above-mentioned object, a position estimation apparatus according to the present invention comprises:

a data collection means for collecting measurement data related to an inter-device distance measured by one wireless device between the one wireless device and another wireless device, and related to reliability of the inter-device distance to the another wireless device, calculated by the one wireless device; and a wireless-device position estimation means for estimating a position of a position-unknown wireless device, based on measurement data collected by the data collection means, and previously collected measurement data related to a measured inter-device distance between one wireless device and another wireless device and related to reliability of the inter-device distance.

A position estimation system according the present invention, comprises:

a plurality of wireless devices for measuring an inter-device distance between a wireless device and another wireless device by transmitting and receiving a radio signal to and from each other, calculating, based on reception quality of the radio signal used in measurement of the inter-device distance, reliability of the inter-device distance, and outputting the measured inter-device distance and the calculated reliability of the inter-device distance at a predetermined cycle; and a position estimation apparatus for collecting the measured inter-device distance and the calculated reliability of the inter-device distance from the plurality of wireless devices, calculating a device relative position of each of the wireless devices, and outputting a device-position estimation result, wherein the position estimation apparatus comprises:

an inter-wireless-device distance update means for collecting measurement data related to a measured inter-device distance between a wireless device and another wireless device and related to reliability of the inter-device distance, and updating an accumulated inter-device distance and reliability of the inter-device distance; and a wireless-device position estimation means for estimating a position of a position-unknown wireless device, based on measurement data collected by the inter-wireless-device distance update means, and previously collected measurement data related to a measured inter-device distance between a wireless device and another wireless device and related to reliability of the inter-device distance.

A position estimation method according to the present invention, comprises:

collecting measurement data related to a measured inter-device distance between a wireless device and another wireless device and related to reliability of the inter-device distance, and updating an accumulated inter-device distance and reliability of the inter-device distance; and estimating a position of a position-unknown wireless device, based on the collected measurement data, and previously collected measurement data related to a measured inter-device distance between a wireless device and another wireless device and related to reliability of the inter-device distance.

A recording medium for position estimation according to the present invention is a computer-readable recording medium in which a position estimation program is recorded, the position estimation program causes a processor to:

collect measurement data related to a measured inter-device distance between a wireless device and another wireless device and related to reliability of the inter-device distance, and execute updating processing on an accumulated inter-device distance and reliability of the inter-device distance, and p execute estimation processing on a position of a position-unknown wireless device, based on the collected measurement data, and previously collected measurement data related to a measured inter-device distance between a wireless device and another wireless device and related to reliability of the inter-device distance.

Advantageous Effect of Invention

According to the present invention, it is possible to estimate a position of a position-unknown wireless device with high accuracy by using a relative positional relationship between wireless devices, the relative positional relationship being grasped by the wireless devices mutually performing wireless communication.

DESCRIPTION OF EMBODIMENTS

Preferred example embodiments of the present invention will be described in detail with reference to the drawings. Herein, it is assumed that a symbol represents a vector. A vector notation for use in description, for example, the following expression:

$$\vec{t}, \vec{a}_i, t_{k-1}, \vec{r}, \vec{\theta}_{k-1}, \vec{x}_i \qquad [\text{Math. 1}]$$

or the like may be represented as t, $a_i$, $t_{k-1}$, r, $\theta_{k-1}$, $x_i$ or the like for convenience. However, it is assumed that the both indicate the same. Note that a direction of an arrow in each drawing indicates an example, but is not intended to limit a direction of a signal between blocks.

Figure 1:
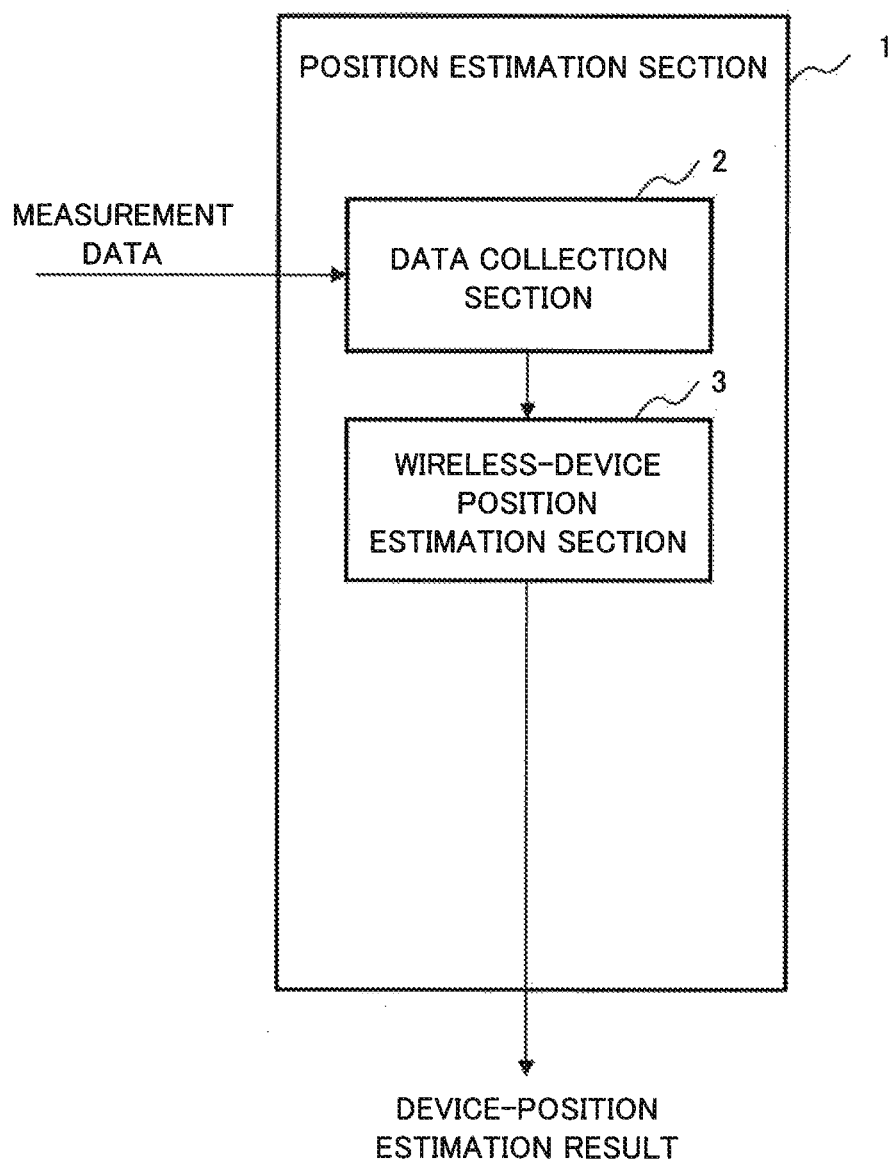
FIG. 1 is a block diagram illustrating a configuration of a position estimation system according to an example embodiment of a most superordinate concept of the present invention.

First, an example embodiment of a most superordinate concept of the present invention will be described. FIG. 1 is a block diagram illustrating a configuration of a position estimation apparatus according to an example embodiment of a most superordinate concept of the present invention. A position estimation section 1 as an example of the position estimation apparatus according to the present example embodiment includes a data collection section 2 as an example of a data collection means, and a wireless-device position estimation section 3 as an example of a wireless-device position estimation means.

The data collection section 2 collects measurement data related to an inter-device distance between one wireless device and another wireless device, the inter-device distance being measured by the one wireless device, and related to reliability of the inter-device distance between the one wireless device and the another wireless device, the reliability being calculated by the one wireless device. The inter-device distance of the measurement data is measured by the one wireless device transmitting and receiving a radio signal to and from the another wireless device. The reliability of the inter-device distance of the measurement data is calculated based on reception quality of the radio signal used in measurement of the inter-device distance.

The wireless-device position estimation section 3 estimates a position of a position-unknown wireless device, based on the measurement data collected by the data collection section 2, and the previously collected measurement data related to the measured inter-device distance between the one wireless device and the another wireless device and related to the reliability of the inter-device distance. Then, the wireless-device position estimation section 3 outputs a device-position estimation result. The position estimation apparatus according to the present example embodiment estimates a position of a position-unknown wireless device, based on the measurement data collected by the data collection section 2, and the previously collected measurement data related to the measured inter-device distance between the one wireless device and the another wireless device and related to the reliability of the inter-device distance. This makes it possible to estimate a position of a position-unknown wireless device among a plurality of wireless devices with high accuracy. Hereinafter, a preferred example embodiment of the present invention will be described in further detail.

Example Embodiment

Next, a position estimation apparatus, a position estimation system, a position estimation method, and a recording medium for position estimation according to one example embodiment of the present invention will be described. Note that the example embodiment is for indicating an example, and the disclosed apparatus and system are not limited to a configuration of the following example embodiment.
(Configuration of Example Embodiment)

Figure 2:
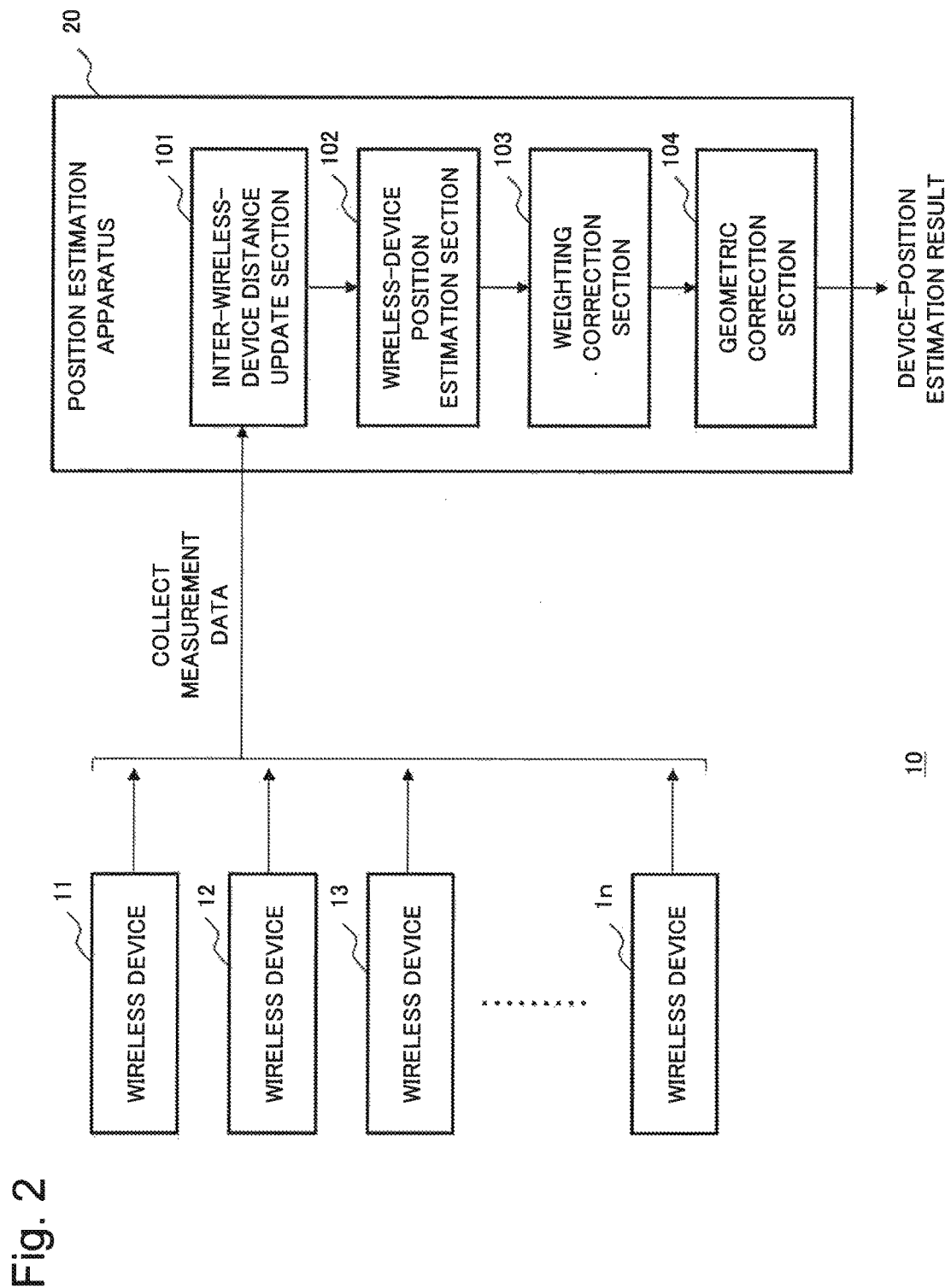
FIG. 2 is a block diagram illustrating a configuration of a position estimation system according to one example embodiment of the present invention.

A position estimation system according to one example embodiment of the present invention will be described. FIG. 2 is a block diagram illustrating a configuration of a position estimation system according to one example embodiment of the present invention. A position estimation system 10 according to one example embodiment of the present invention is configured by comprising a plurality of wireless devices 11 to 1n (n is a natural number), and a position estimation apparatus 20.

The wireless devices 11 to 1n include a position-unknown wireless device and a position-known wireless device in a mixed manner. Each wireless device outputs, at a predetermined cycle, an inter-device distance between the one wireless device and another wireless device measured by transmitting and receiving a radio signal, and reliability of a distance measurement value calculated based on reception quality of the radio signal used in measurement of the inter-device distance.

The position estimation apparatus 20 has a configuration comprising an inter-wireless-device distance update section 101 as an example of an inter-wireless-device distance update means, a wireless-device position estimation section 102 as an example of a wireless-device position estimation means, and a weighting correction section 103 as an example of a weighting correction means. The position estimation apparatus 20 further comprises a geometric correction section 104 as an example of a geometric correction means.

The position estimation apparatus 20 collects an inter-device distance and reliability of a distance measurement value output from each of the wireless devices 11 to 1n as measurement data, calculates a relative position of each wireless device and reliability of the relative position, and outputs the calculated relative position and reliability as a device-position estimation result.

The inter-wireless-device distance update section 101 comprises a storage device or a storage area for storing a previous inter-device distance and reliability of the previous inter-device distance, which are previously calculated. The inter-wireless-device distance update section 101 updates the inter-device distance and the reliability of the inter-device distance, based on the following two. One is an inter-device distance and reliability of a distance measurement value output from each of the wireless devices 11 to 1*n*. The other is a previous inter-device distance and reliability of the previous inter-device distance stored in the storage device.

The wireless-device position estimation section 102 estimates a position of an unknown wireless device, based on the inter-device distance updated by the inter-wireless-device distance update section 101, and position information of a position-known wireless device.

The weighting correction section 103 corrects the position of the unknown wireless device estimated by the wireless-device position estimation section 102, by using the inter-device distance and the reliability of the inter-device distance updated by the inter-wireless-device distance update section 101.

The geometric correction section 104 corrects a geometric error such as a rotation error and a surface error remaining at the position of the unknown wireless device corrected by the weighting correction section 103. The correction of the geometric error is performed by using the position information of the position-known wireless device, and the inter-device distance and the reliability of the inter-device distance updated by the inter-wireless-device distance update section 101.

As described above, in the position estimation apparatus 20 according to the present example embodiment, an inter-device distance and reliability of a distance measurement value output from each wireless device are collected. The inter-device distance and the reliability of the distance measurement value are updated by the inter-wireless-device distance update section 101, and thereafter, an unknown-wireless-device position is estimated by the wireless-device position estimation section 102. A result of the estimation is corrected by the weighting correction section 103 and the geometric correction section 104. Accordingly, a high-accuracy position estimation result can be obtained.

Figure 3:
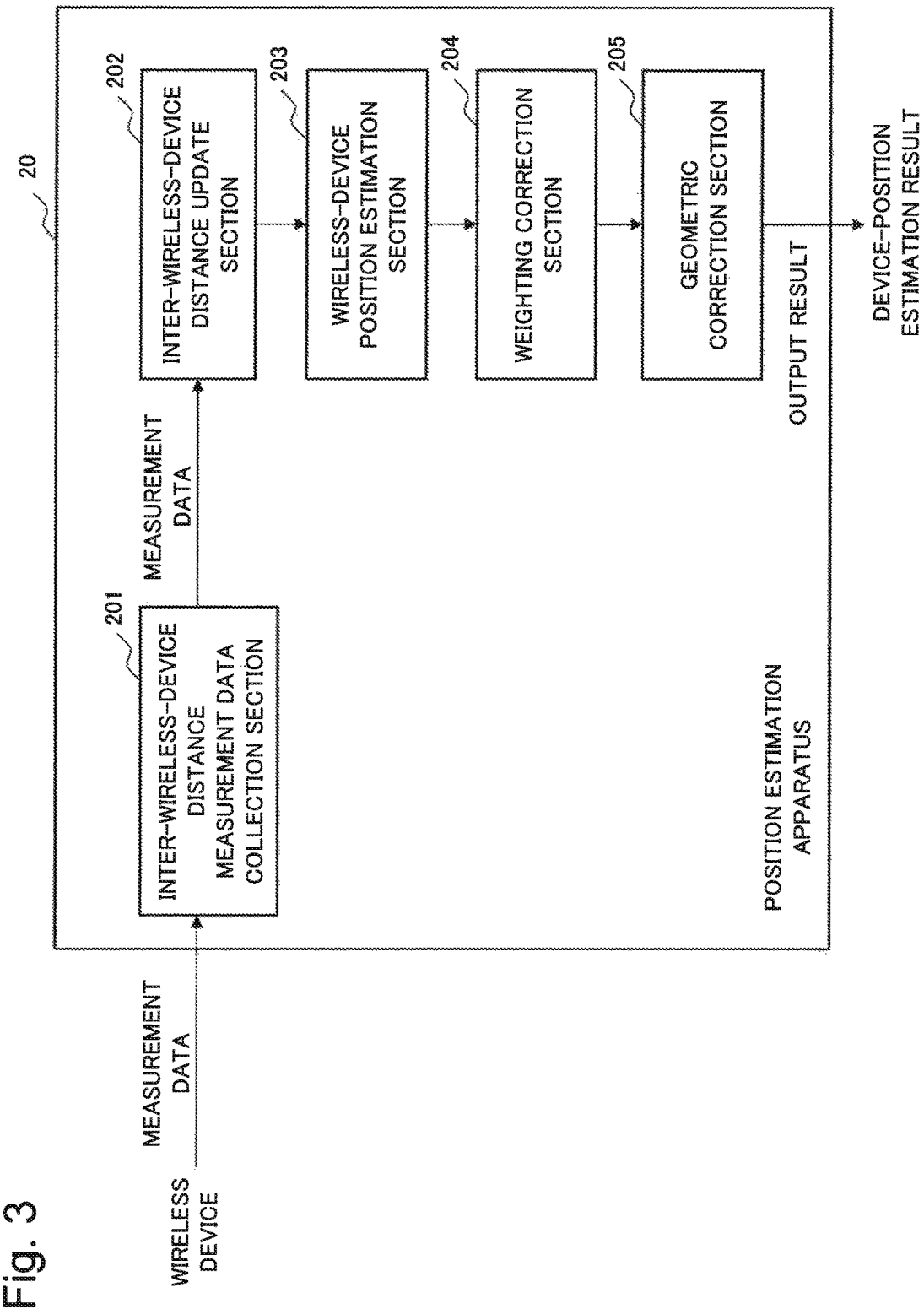
FIG. 3 is a block diagram illustrating a configuration of a position estimation apparatus according to one example embodiment of the present invention.

Next, a configuration of the position estimation apparatus 20 according to one example embodiment of the present invention will be described in further detail. FIG. 3 is a block diagram illustrating the configuration of the position estimation apparatus 20 according to one example embodiment of the present invention.

The position estimation apparatus 20 collects an inter-wireless-device distance and reliability of the inter-wireless-device distance, which are data measured and calculated by each of the wireless devices 11 to 1*n*, estimates a wireless-device position, and outputs a device-position estimation result. Note that, in the description hereinafter, "an inter-wireless-device distance and reliability of the inter-wireless-device distance" may also be referred to as "inter-wireless-device distance data and the like".

The position estimation apparatus 20 in FIG. 3 has a configuration comprising an inter-wireless-device distance measurement data collection section 201, an inter-wireless-device distance update section 202, a wireless-device position estimation section 203, a weighting correction section 204, and a geometric correction section 205.

The inter-wireless-device distance measurement data collection section 201 instructs each of the wireless devices 11 to 1*n* to measure an inter-wireless-device distance, collects, from each of the wireless devices 11 to 1*n*, an inter-wireless-device distance and reliability of the inter-wireless-device distance as measurement data, and accumulates and organizes the measurement data. As described above, each of the wireless devices 11 to 1*n* measures an inter-wireless-device distance at a predetermined cycle, and sequentially reports the measurement data to the position estimation apparatus 20.

The inter-wireless-device distance and the reliability of the inter-wireless-device distance (measurement data) collected by the inter-wireless-device distance measurement data collection section 201 are sent to the inter-wireless-device distance update section 202.

The inter-wireless-device distance update section 202 calculates an updated inter-wireless-device distance and reliability of the inter-wireless-device distance, based on the following two. One is a previous inter-wireless-device distance and reliability of the inter-wireless-device distance. The other is an inter-wireless-device distance and reliability of the inter-wireless-device distance currently collected by the inter-wireless-device distance measurement data collection section 201.

Herein, a previous inter-wireless-device distance and reliability of the inter-wireless-device distance indicate an inter-wireless-device distance and reliability of the inter-wireless-device distance that are updated based on the inter-wireless-device distance and the reliability of the inter-wireless-device distance having been sent to the inter-wireless-device distance update section 202 so far. The previous inter-wireless-device distance and the reliability of the inter-wireless-device distance are accumulated in a storage device or a storage area present within the inter-wireless-device distance update section 202.

The wireless-device position estimation section 203 estimates a position of an unknown wireless device, based on the inter-wireless-device distance updated by the inter-wireless-device distance update section 202, and position information of an absolute-position-known wireless device. A wireless-device position estimation process will be described later in detail.

Herein, basically, a position of a wireless device is expressed as a relative position. In other words, it is assumed that a wireless device to be a reference is determined, and a device position of another wireless device is expressed by a relative coordinate with a coordinate of the wireless device as a reference. However, in a case in which an absolute-position-known wireless device is present, the wireless-device position serves as a reference, and information on the absolute position is used to estimate a relative position or an absolute position allowing flexibility in accordance with the number of the known wireless devices.

The weighting correction section 204 corrects the position of the wireless device estimated by the wireless-device position estimation section 203. For the position correction, the inter-wireless-device distance and the reliability of the inter-wireless-device distance updated by the inter-wireless-device distance update section 202 are used, in addition to the position of the wireless device. A weighting correction process will be described later in detail.

The geometric correction section 205 corrects a rotation error or a surface error remaining at the estimated position of the wireless device corrected by the weighting correction section 204, and outputs a result. A geometric correction process will be described later in detail.

(Operation of Example Embodiment)

Figure 4:
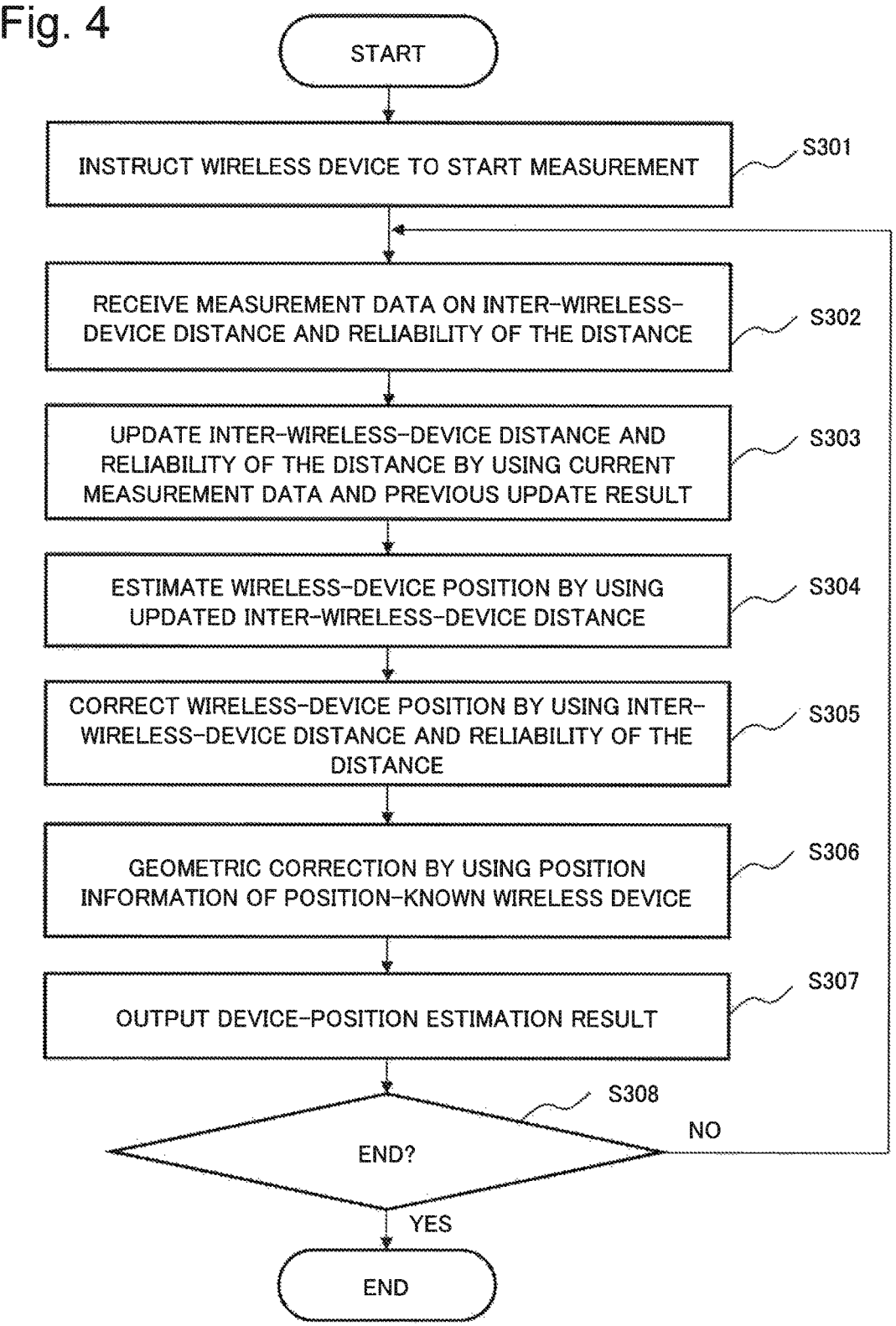
FIG. 4 is a flowchart describing a flow of processing of a position estimation method according to one example embodiment of the present invention.

Next, a position estimation method according to one example embodiment of the present invention will be described. FIG. 4 is a flowchart describing a flow of processing of a position estimation method according to one example embodiment of the present invention.

First, the position estimation apparatus 20 instructs each of the wireless devices 11 to 1*n* to start measuring a distance between the own wireless device and a peripheral wireless device (Step S301). For example, upon being instructed by a not-illustrated external device to start a position estimation operation, it is assumed that, in the position estimation apparatus 20, the inter-wireless-device distance measurement data collection section 201 issues a measurement start instruction to each of the wireless devices 11 to 1n.

Each of the wireless devices 11 to 1n having received an instruction for starting measurement measures a distance between the own wireless device and another wireless device by transmitting and receiving a radio signal, calculates, based on reception quality of the radio signal used in measurement of the distance, reliability of a distance measurement value, and reports the distance and the reliability to the position estimation apparatus 20, as described above. Then, each of the wireless devices 11 to 1n executes the measurement and the reporting repeatedly at a predetermined cycle.

The position estimation apparatus 20 receives an inter-wireless-device distance and reliability of the distance of measurement data (Step S302). The inter-wireless-device distance measurement data collection section 201 of the position estimation apparatus 20 sequentially collects the inter-wireless-device distance and the reliability of the inter-wireless-device distance reported by each of the wireless devices 11 to 1n.

The inter-wireless-device distance measurement data collection section 201 transfers the collected inter-wireless-device distance and the reliability of the inter-wireless-device distance to the inter-wireless-device distance update section 202.

The inter-wireless-device distance update section 202 updates, based on the inter-wireless-device distance and the reliability of the inter-wireless-device distance, and an updated result of a previous measurement result, an inter-wireless-device distance and reliability of the inter-wireless-device distance (Step S303). The updating of the inter-wireless-device distance and the reliability of the inter-wireless-device distance is performed upon receiving the measurement data on the inter-wireless-device distance and the reliability of the inter-wireless-device distance.

The measurement data, or the updated inter-wireless-device distance and reliability of the inter-wireless-device distance are stored in a storage device or a storage area present within the inter-wireless-device distance update section 202, for next update processing of an inter-wireless-device distance and reliability of the inter-wireless-device distance. At the same time with the storing, the updated inter-wireless-device distance and reliability of the inter-wireless-device distance are transferred to the wireless-device position estimation section 203.

The wireless-device position estimation section 203 estimates a position of each of the wireless devices 11 to 1n, based on the inter-wireless-device distance transferred from the inter-wireless-device distance update section 202 (Step S304). It is assumed that a position estimated herein is such a relative position or an absolute position that has flexibility in accordance with the number of absolute-position-known wireless devices.

For example, in a case in which no absolute-position-known wireless device is present, a specific wireless device to be a reference is determined, and a relative position coordinate of another wireless device is estimated with a position of the specific wireless device as an origin. In a case in which one absolute-position-known wireless device is present, a relative position is estimated with the wireless device as a reference. In a case in which two absolute-position-known wireless devices are present, a relative position is estimated with a line segment linking the two wireless devices as a reference. In this case, position estimation in a two-dimensional space results in such flexibility that allows mirror mapping with respect to the line segment. In addition, position estimation in a three-dimensional space results in such flexibility that allows mirror mapping with respect to a plane containing the line segment, and allows being in a positional relationship after rotation mapping about the line segment.

In a case in which three absolute-position-known wireless devices are present, a relative position is estimated with a plane containing positions of these wireless devices as a reference, except for a case in which the positions of these wireless devices are arranged in a straight line. In this case, position estimation in a two-dimensional space results in estimation of an absolute position with no flexibility, and position estimation in a three-dimensional space results in such position estimation that allows mirror mapping with respect to the plane.

In a case in which four or more absolute-position-known wireless devices are present, an absolute position with no flexibility is estimated, except for a case in which positions of these wireless devices exist within one plane.

The wireless-device position estimation section 203 transfers, to the weighting correction section 204, the inter-wireless-device distance and the reliability of the inter-wireless-device distance transferred from the inter-wireless-device distance update section 202, and the wireless-device position obtained by the wireless-device position estimation section 203.

The weighting correction section 204 corrects, based on the reliability of the inter-wireless-device distance, the wireless-device position obtained by the wireless-device position estimation section 203 (Step S305). The weighting correction section 204 also obtains, at the same time, reliability of the wireless-device position. The wireless-device position corrected by the weighting correction section 204, and the reliability thereof are transferred to the geometric correction section 205.

The geometric correction section 205 corrects a rotation error or a surface error remaining at the estimated position of the wireless device corrected by the weighting correction section 204, by using position information of a position-known wireless device (Step S306).

The geometric correction section 205 outputs, to a not-illustrated external device, an updated position of the wireless device as a device-position estimation result (Step S307).

Then, the position estimation apparatus 20 confirms an end condition of the processing (Step S308). When an end condition is not reached (NO at Step S308), the position estimation apparatus 20 issues an instruction to the inter-wireless-device distance update section 202 to again execute update processing based on re-measurement data. In this case, the processing from Steps S302 to S308 is repeated.

In addition, when an end condition is reached at Step S308 (YES at Step S308), the position estimation apparatus 20 ends the processing.

Herein, an end condition can be set arbitrarily. For example, an end condition may be a case of receiving an end instruction from a not-illustrated external device.

Figure 5:
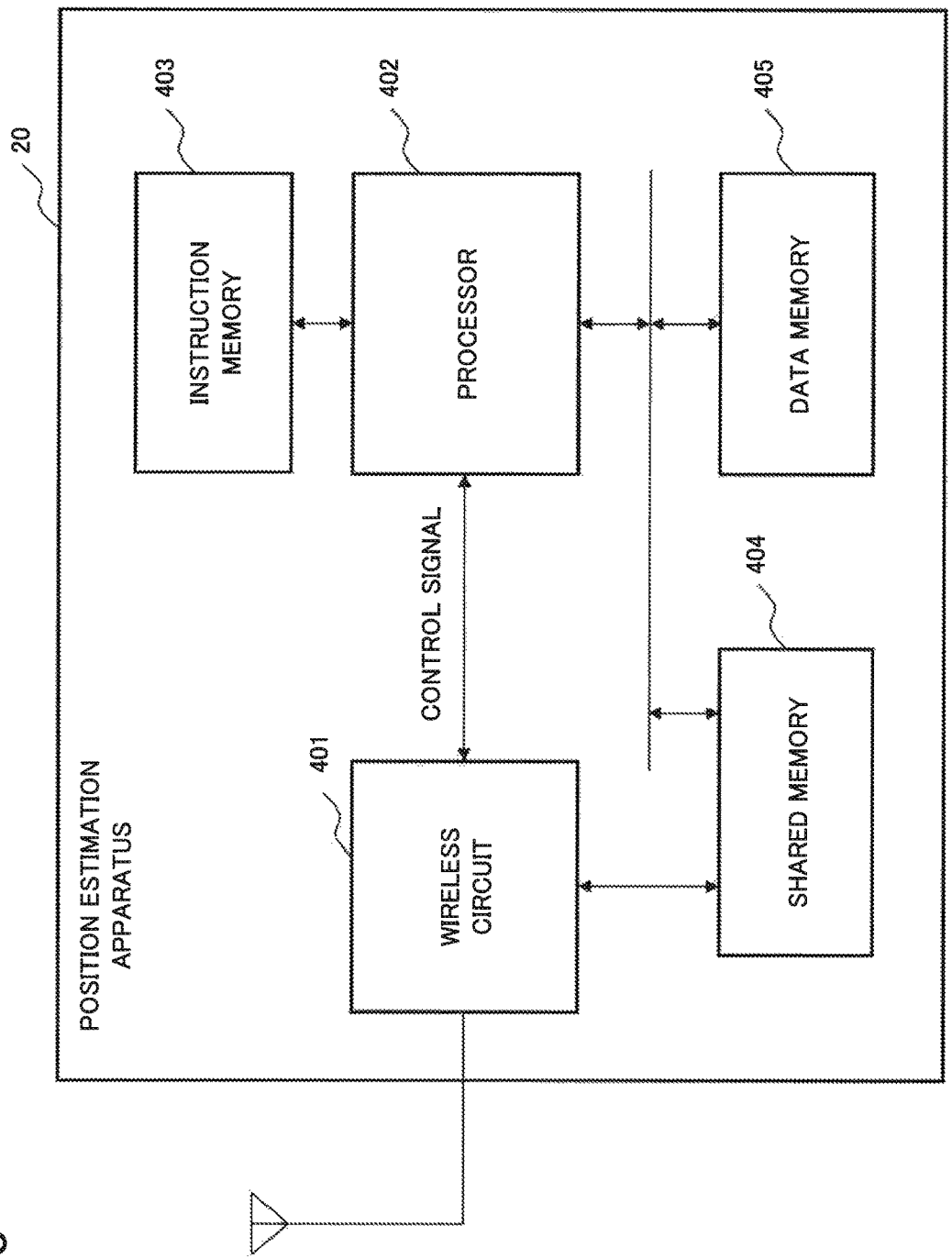
FIG. 5 is a block diagram illustrating a hardware configuration of a position estimation apparatus according to one example embodiment of the present invention.

Next, a recording medium for position estimation according to one example embodiment of the present invention will be described. A recording medium for position estimation according to one example embodiment of the present invention is a computer-readable recording medium that records a position estimation program. Hereinafter, this position estimation program will be described. FIG. 5 is a block diagram illustrating a hardware configuration of a position estimation apparatus according to one example embodiment of the present invention, in which the position estimation program according to one example embodiment of the present invention is executed. A position estimation apparatus 20 in FIG. 5 has a configuration comprising a wireless circuit 401, a processor 402, an instruction memory 403, a shared memory 404, and a data memory 405. The position estimation apparatus 20 in FIG. 5 may be implemented in a software manner by executing a program providing each function of each component by means of the processor 402 on a processor processing device.

The above program may be distributed in a form of a recording medium for position estimation, for example, a general-purpose semiconductor recording device such as a Compact Flash (CF) (registered trademark) and a Secure Digital (SD), a magnetic recording medium such as a Flexible Disk, an optical recording medium such as a Compact Disc Read Only Memory (CD-ROM), or the like. A function of the present example embodiment may be implemented in a software manner by reading a program recorded on such a recording medium.

In FIG. 5, inter-wireless-device distance data and the like acquired by each wireless device are wirelessly transmitted to the position estimation apparatus 20. The position estimation apparatus 20 receives the inter-wireless-device distance data and the like at the wireless circuit 401, and temporarily stores the received data and the like in the shared memory 404. The instruction memory 403 stores a program describing each procedure of a wireless-device position estimation function, an inter-wireless-device distance update function, a motion vector generation function, and a wireless-device position update function. The inter-wireless-device distance data and the like stored in the shared memory 404 are processed by the processor 402 executing each program stored in the instruction memory 403, and estimation processing of a position of each wireless device is performed.

Figure 6:
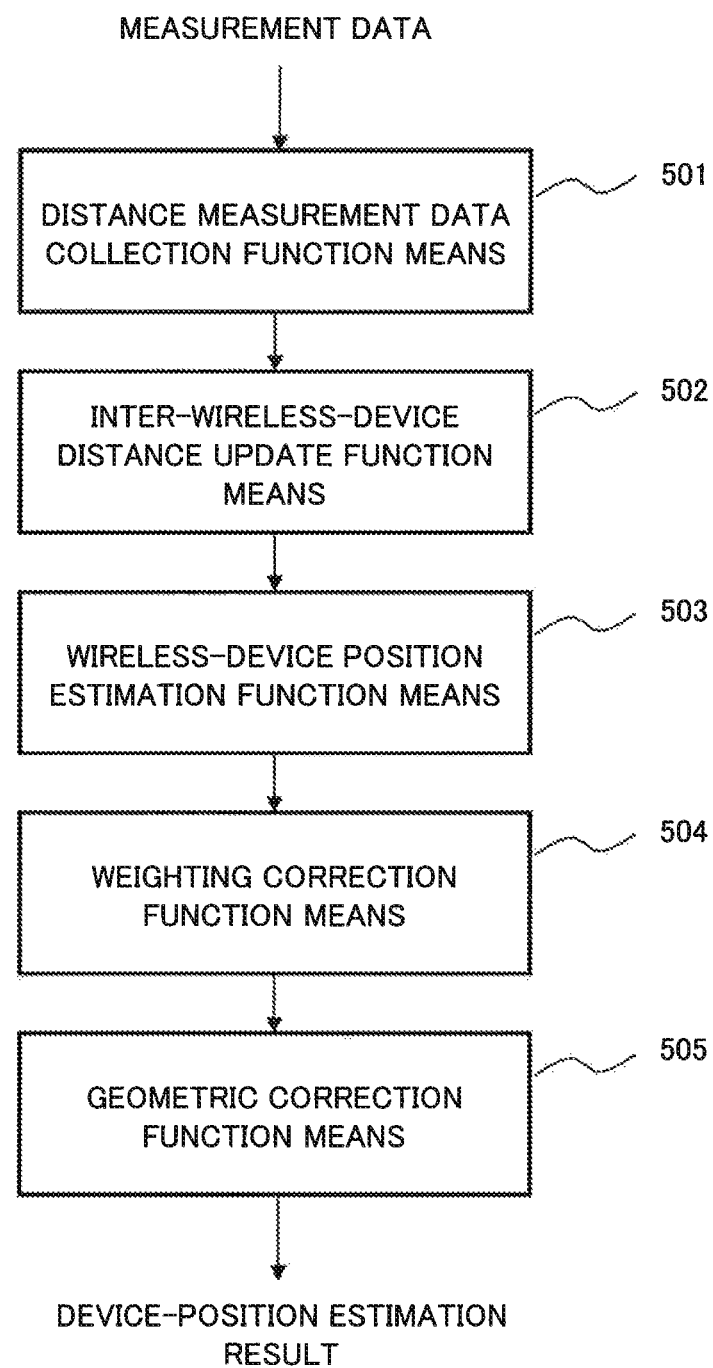
FIG. 6 is a block diagram illustrating a configuration of function means implemented by a recording medium for position estimation according to one example embodiment of the present invention.

FIG. 6 illustrates a configuration of function means implemented by a position estimation program according to one example embodiment of the present invention. The position estimation program according to the present example embodiment causes the processor 402 to function as a distance measurement data collection function means 501, an inter-wireless-device distance update function means 502, a wireless-device position estimation function means 503, a weighting correction function means 504, and a geometric correction function means 505.

The distance measurement data collection function means 501 collects an inter-device distance between a wireless device and another wireless device measured by transmitting and receiving a radio signal, the inter-device distance being output by each wireless device at a predetermined cycle, and reliability of the inter-device distance calculated based on reception quality of the radio signal used in measurement of the inter-device distance.

The inter-wireless-device distance update function means 502 calculates an updated inter-wireless-device distance and reliability of the inter-wireless-device distance, based on the following two. One is a previous inter-wireless-device distance and reliability of the inter-wireless-device distance. The other is the inter-wireless-device distance and the reliability of the inter-wireless-device distance collected by the distance measurement data collection function means 501, Herein, the previous inter-wireless-device distance and the reliability of the inter-wireless-device distance are an inter-wireless-device distance and reliability of the inter-wireless-device distance previously calculated by the inter-wireless-device distance update function means 502, and are stored in the data memory 405.

The wireless-device position estimation function means 503 estimates a position of an unknown wireless device, based on the inter-wireless-device distance updated by the inter-wireless-device distance update function means 502, and position information of an absolute-position-known wireless device.

The weighting correction function means 504 corrects the wireless-device position estimated by the wireless-device position estimation function means 503. For the position correction, the inter-wireless-device distance and the reliability of the inter-wireless-device distance updated by the inter-wireless-device distance update function means 502 are used, in addition to the wireless-device position.

The geometric correction function means 505 corrects a rotation error or a surface error remaining at the estimated position of the wireless device corrected by the weighting correction function means 504. In this manner, the processor 402 calculates, by using a position estimation program, a relative position of each wireless device and reliability of the relative position from measurement data on an inter-device distance and reliability of the inter-device distance output from each wireless device, and outputs the calculated relative position and reliability as a device-position estimation result.

(Advantageous Effect of Example Embodiment)

In the position estimation system according to the present example embodiment, a position of an unknown wireless device is estimated based on a previous inter-device distance and reliability of the previous inter-device distance, a newly-collected inter-device distance and reliability of the inter-device distance, and position information of a position-known wireless device.

Accordingly, in the present example embodiment, a position of a wireless device can be estimated with high accuracy, for use in grasping a relative positional relationship through mutual wireless communication of wireless devices.

Specific Example

Hereinafter, a specific example of a method of calculating a distance between a wireless device and another wireless device by means of the wireless devices 11 to 1n will be described with reference to FIGS. 7 to 9.

<Calculation of Inter-Wireless-Device Distance>

Each of the wireless devices 11 to 1n in FIG. 2 performs wireless communication with another wireless device, and calculates a distance by measuring a propagation delay time of a signal. There are several methods as a method of measuring a propagation delay time. For example, each of the wireless devices 11 to 1n may hold a timer common in a network system, and may calculate a distance from a difference between a transmission time of a signal from another wireless device and a reception time of the signal. In addition, each of the wireless devices 11 to 1n may measure a time for a signal to make a round trip between two wireless devices, and may calculate a distance between the two wireless devices from the measured round-trip time. In the delay measurement circuit disclosed in PTL6, a distance is calculated from a round-trip time for a timing pulse signal transmitted from a transmission side to be turned back at a reception side and again received at the transmission side.

Figure 7:
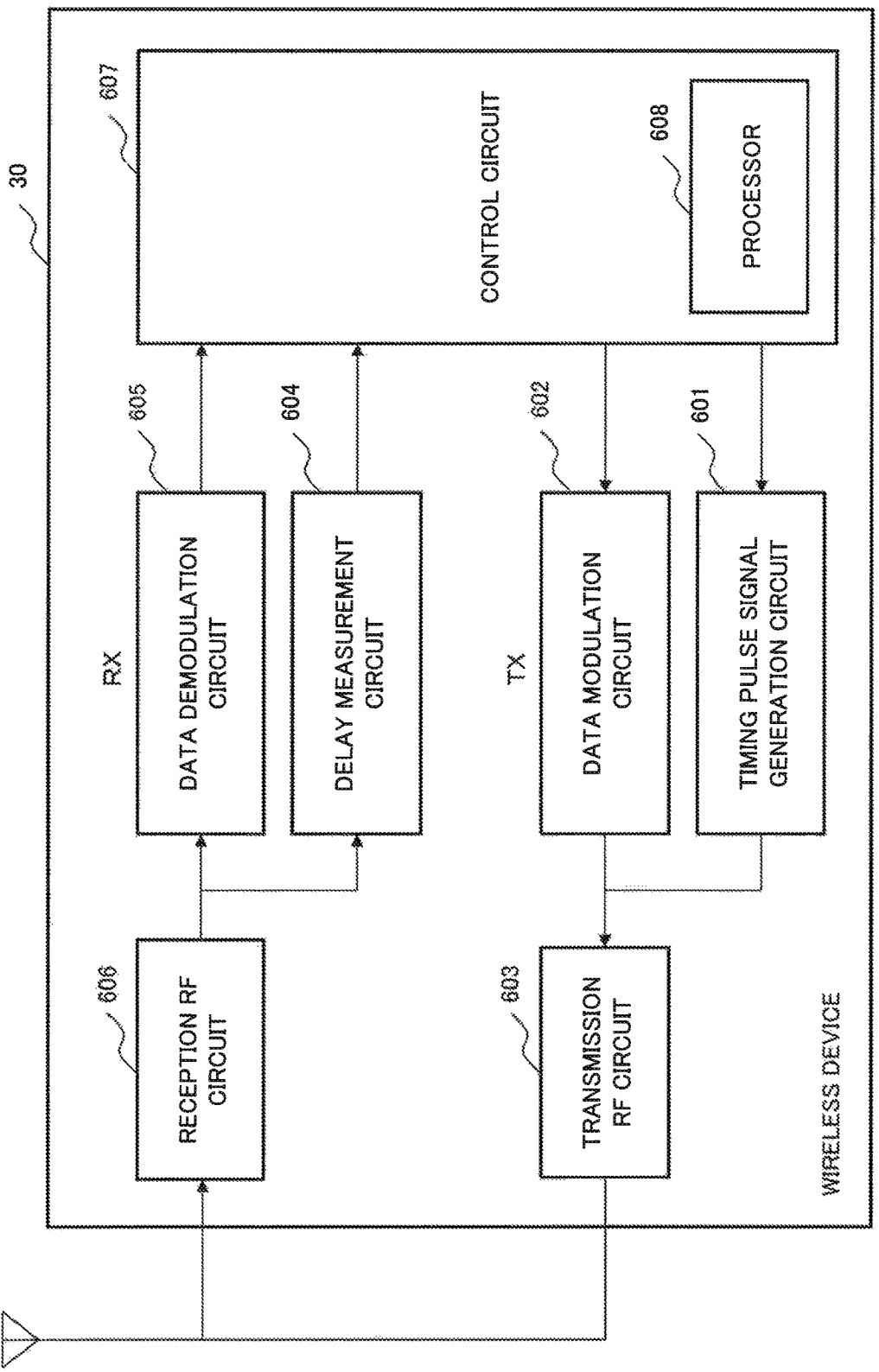
FIG. 7 is a block diagram illustrating a configuration example of a wireless device used in a position estimation system according to one example embodiment of the present invention.

FIG. 7 is a block diagram illustrating a configuration example of a wireless device used in a position estimation system according to one example embodiment of the present invention. A wireless device 30 in FIG. 7 illustrates a specific example of the wireless devices 11 to 1n in FIG. 2. The wireless device according to the present example embodiment employs a method of calculating a distance from a round-trip time for a timing pulse signal transmitted from a transmission side and spread by use of a spread code to be turned back at a reception side and again received at the transmission side.

The wireless device 30 according to the present example embodiment is provided with a transmission unit (TX: Transmitter) comprising a timing pulse signal generation circuit 601 and a data modulation circuit 602, and a reception unit (RX: Receiver) comprising a delay measurement circuit 604 and a data demodulation circuit 605. Besides the above, the wireless device 30 has a configuration comprising a transmission radio frequency (RF) circuit 603 that is a transmission circuit of a radio signal, a reception RF circuit 606 that is a reception circuit of a radio signal, and a control circuit 607 provided with a processor 608.

The wireless device 30 transmits a timing pulse signal created by using the timing pulse signal generation circuit 601 to a peripheral another wireless device, and measures a time difference in a turned-back timing pulse signal by using the delay measurement circuit 604.

At this time, the wireless device 30 is to receive timing pulse signals turned back from a plurality of other wireless devices within a communication enabled range. Then, the wireless device 30 can identify from which wireless device a timing pulse signal is turned back, based on identification information inserted by another wireless device at a time of turning back the timing pulse signal.

The control circuit 607 calculates a distance between the own wireless device and another wireless device, based on a time difference in transmission and reception of the timing pulse signal output from the delay measurement circuit 604.

In addition, the wireless device 30 measures a delay time, and also measures a Signal to Noise (SN) ratio of a received signal used in measurement of the delay time and a delay spread of the received signal. The delay spread of the received signal is also referred to as a delay spread. The SN ratio and the delay spread of the received signal are used for calculating reliability of an inter-device distance measurement value, as will be described later. Note that a delay spread is a parameter representing a delay characteristic of a multipath due to a reflected wave, and represents a standard deviation with respect to a delay time of a power delay profile.

Note that, instead of the wireless device 30 calculating an inter-device distance based on measurement of a delay time, a specific wireless device may be configured to analyze a delay time or the like and calculate an inter-device distance. In this case, each wireless device having measured a delay time modulates the measured delay time by using the data modulation circuit 602, and transmits the modulated delay time to the specific wireless device via the transmission RF circuit 603. Then, the specific wireless device converts a radio signal received via the reception RF circuit 606 into a baseband signal, demodulates data by using the data demodulation circuit 605, and analyzes the delay time by using the control circuit 607.

Figure 8:
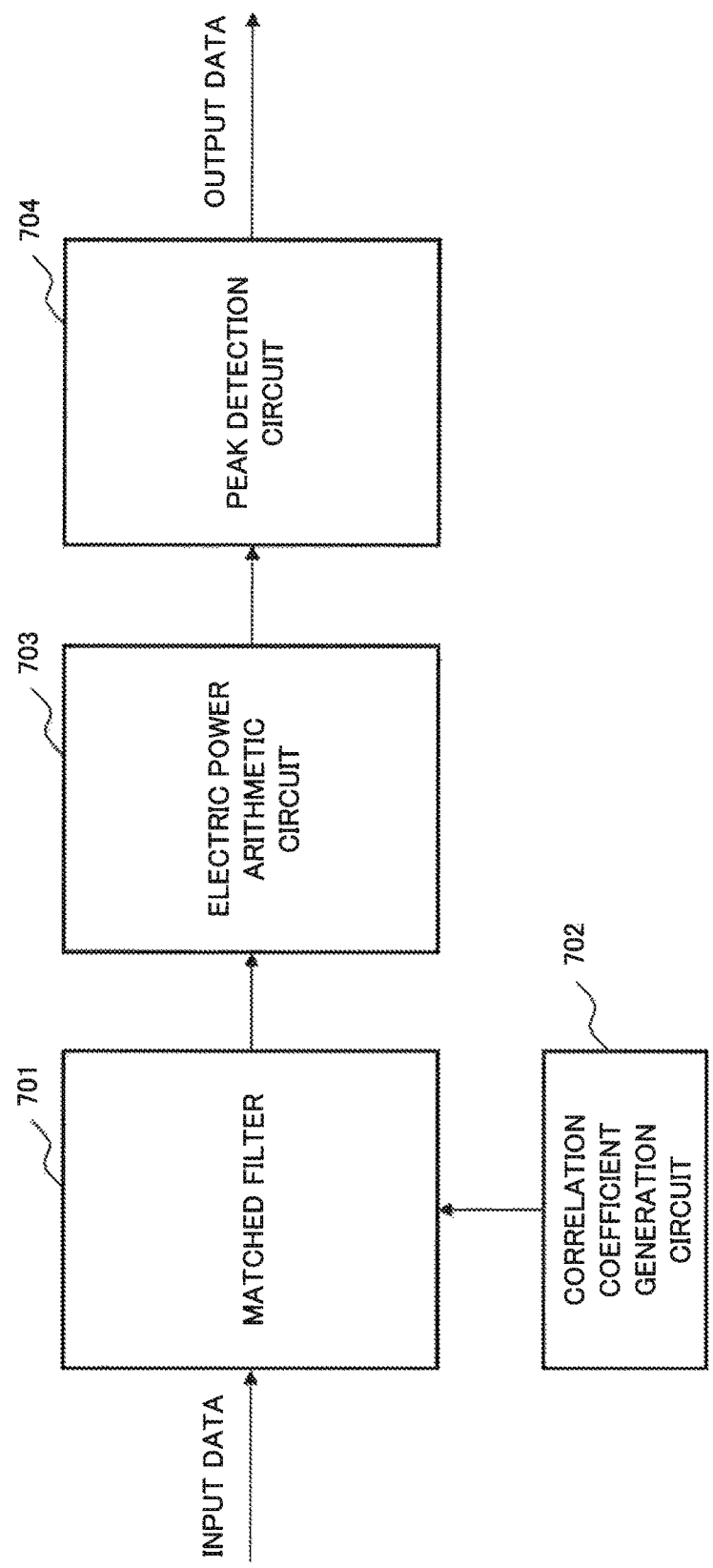
FIG. 8 is a block diagram illustrating a configuration example of a delay measurement circuit of a wireless device.
Figure 9:
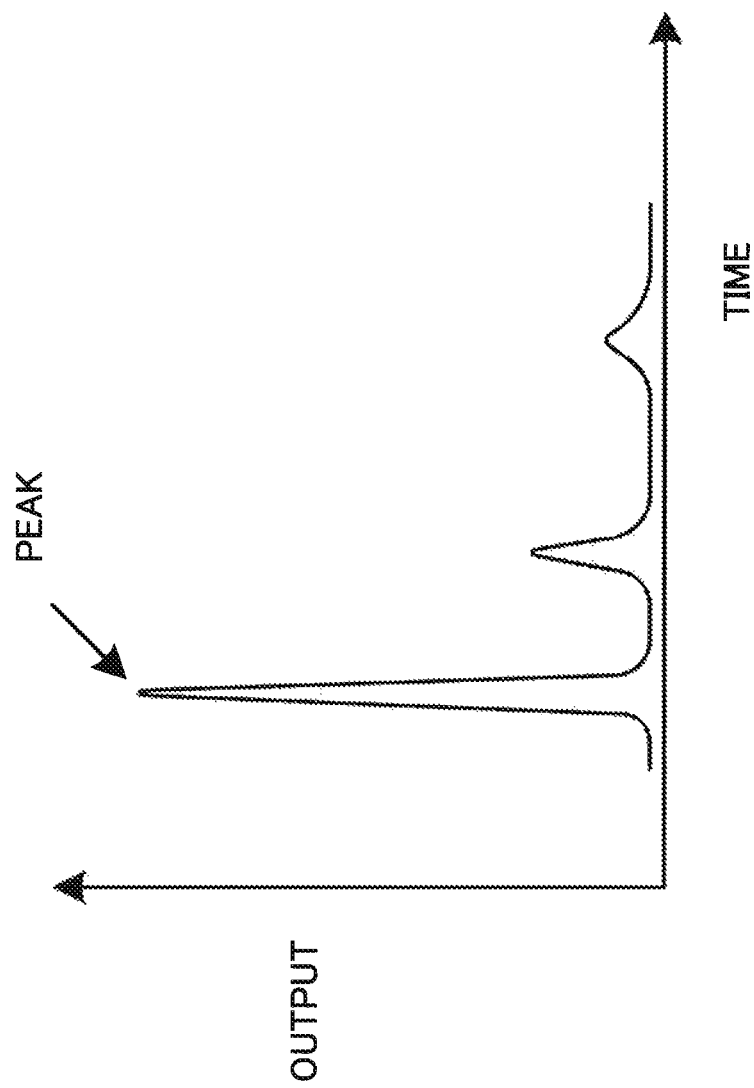
FIG. 9 is a waveform chart illustrating an example of a power profile of a received signal in a wireless device.

FIG. 8 is a block diagram illustrating a configuration example of the delay measurement circuit 604 of the wireless device 30. In addition, FIG. 9 is a waveform chart illustrating an example of a power profile of a received signal in the wireless device 30.

As illustrated in FIG. 8, the delay measurement circuit 604 has a configuration comprising a matched filter 701, a correlation coefficient generation circuit 702, an electric power arithmetic circuit 703, and a peak detection circuit 704.

A frequency received by the reception RF circuit 606 in FIG. 7 is down-converted by the matched filter 701 into an optimum frequency, and is input to the matched filter 701. At the same time, a correlation coefficient for a timing pulse signal is given by the correlation coefficient generation circuit 702 to the matched filter 701. The matched filter 701 computes a correlation value between input data and a code string of a timing pulse signal, and outputs a cross-correlation vector value in accordance with a degree of the correlation. The cross-correlation vector value output from the matched filter 701 is converted by the electric power arithmetic circuit 703 into an electric power, and a power profile is generated. The power profile has a peaked waveform as in FIG. 9.

The power profile output from the electric power arithmetic circuit 703 is input to the peak detection circuit 704. By the peak detection circuit 704 measuring a time of a peak point of the power profile, an arrival time of the timing pulse signal can be obtained. In addition, a delay spread can be also obtained from the power profile.

<Calculation of Reliability of Inter-Wireless-Device Distance>

A reliability ($\sigma$) of an inter-wireless-device distance is calculated by using an SN ratio (r) and a delay spread (d) of a received signal. A reliability ($\sigma$) of an inter-wireless-device distance represents a standard deviation of a measurement value of the inter-wireless-device distance, and takes such a positive real number value that becomes 0 for the most probability.

A reliability ($\sigma$) of an inter-wireless-device distance is obtained by the following expression.

$$\sigma = f(d)g(r) \quad \text{[Math. 2]}$$

Herein, functions f(d) and g(r) are polynomial functions. Coefficients of the functions are wireless-device-specific values, and are measured for each wireless device in advance and obtained through fitting with respect to an argument.

This means that, for example, when it is assumed that the function f(d) is represented by the following expression:

$$f(d) = \Sigma a_i d^i \quad \text{[Math. 3]}$$

a coefficient $a_i$ is obtained through fitting from an actual measurement result.

Note that, in the present specific example, it is assumed that a reliability ($\sigma$) of an inter-wireless-device distance is computed by each wireless device, but may be computed by a specific wireless device as described above. In addition, further, radio quality data may be sent together with an inter-wireless-device distance to the position estimation apparatus 20, and the position estimation apparatus 20 may be configured to calculate a reliability ($\sigma$).

Next, a specific example of a method of updating an inter-wireless-device distance and reliability of the inter-wireless-device distance in the inter-wireless-device distance update section 202 of the position estimation apparatus 20 will be described.

<Updating of Inter-Wireless-Device Distance Information>

The inter-wireless-device distance update section 202 obtains, by using a currently-measured inter-wireless-device distance and reliability thereof, and a previous update result, an inter-wireless-device distance and reliability thereof updated through a weighting averaging process.

Herein, a standard deviate is used for expressing reliability of an inter-wireless-device distance.

First, regarding reliability of a previous inter-wireless-device distance, the fact that accuracy of the distance information is degraded with a lapse of time is expressed by using the following expression.

$$d_{curr} = d_{prev}$$
$$\sigma_{curr} = \frac{\sigma_{prev}}{e_{fgt}^{t_{prog}}}$$
[Math. 4]

Herein, $d_{prev}$ indicates an update result of a previous inter-wireless-device distance, and $d_{curr}$ indicates an update result of a previous inter-wireless-device distance after a lapse of a certain time. $\sigma_{prev}$ indicates an update result of a standard deviation of a previous inter-wireless-device distance, and $\sigma_{curr}$ indicates an update result of a standard deviation of a previous inter-wireless-device distance after a lapse of a certain time. $e_{fgt}$ indicates a forgetting coefficient, and $t_{prog}$ indicates an elapsed time from last update. The forgetting coefficient $e_{fgt}$ is a real-number constant equal to or more than one to be given to a system or a state, and indicates a degree of change in a wireless-device position with a lapse of time.

Next, an inter-wireless-device distance and a standard deviate thereof are updated. For the update of the inter-wireless-device distance, an averaging process based on weighting addition using a maximum likelihood estimation method is used.

$$d_{ave} = \frac{\sigma_{meas}^2}{\sigma_{curr}^2 + \sigma_{meas}^2} \cdot d_{curr} + \frac{\sigma_{curr}^2}{\sigma_{curr}^2 + \sigma_{meas}^2} \cdot d_{meas}$$
$$\sigma_{ave} = \frac{\sigma_{curr} \cdot \sigma_{meas}}{\sqrt{\sigma_{curr}^2 + \sigma_{meas}^2}}$$
[Math. 5]

Herein, $d_{meas}$ indicates a currently-measured inter-wireless-device distance, $\sigma_{meas}$ indicates a standard deviate of a currently-measured inter-wireless-device distance, $d_{ave}$ indicates an updated inter-wireless-device distance, and $\sigma_{ave}$ indicates a standard deviate of an updated inter-wireless-device distance.

The updated inter-wireless-device distance $d_{ave}$, and the standard deviate $\sigma_{ave}$ of the updated inter-wireless-device distance are stored in a storage device or a storage area for next update processing of inter-wireless-device distance information.

Next, a specific example of a method of estimation processing of a wireless-device position in the wireless-device position estimation section 203 of the position estimation apparatus 20 will be described.

<Estimation of Wireless Device Position>

The wireless-device position estimation section 203 estimates a position of a position-unknown wireless device by using an inter-wireless-device distance updated by the inter-wireless-device distance update section 202. In the following description, a position-known wireless device is referred to as an anchor node, a wireless device that is a target of position estimation is referred to as a target node, and a position-estimated wireless device is referred to as a pseudo-anchor node.

Position estimation of a plurality of position-unknown wireless devices is performed in order one by one for the wireless devices. The order of estimation is determined by a position estimation sorting method to be described later.

Figure 10:
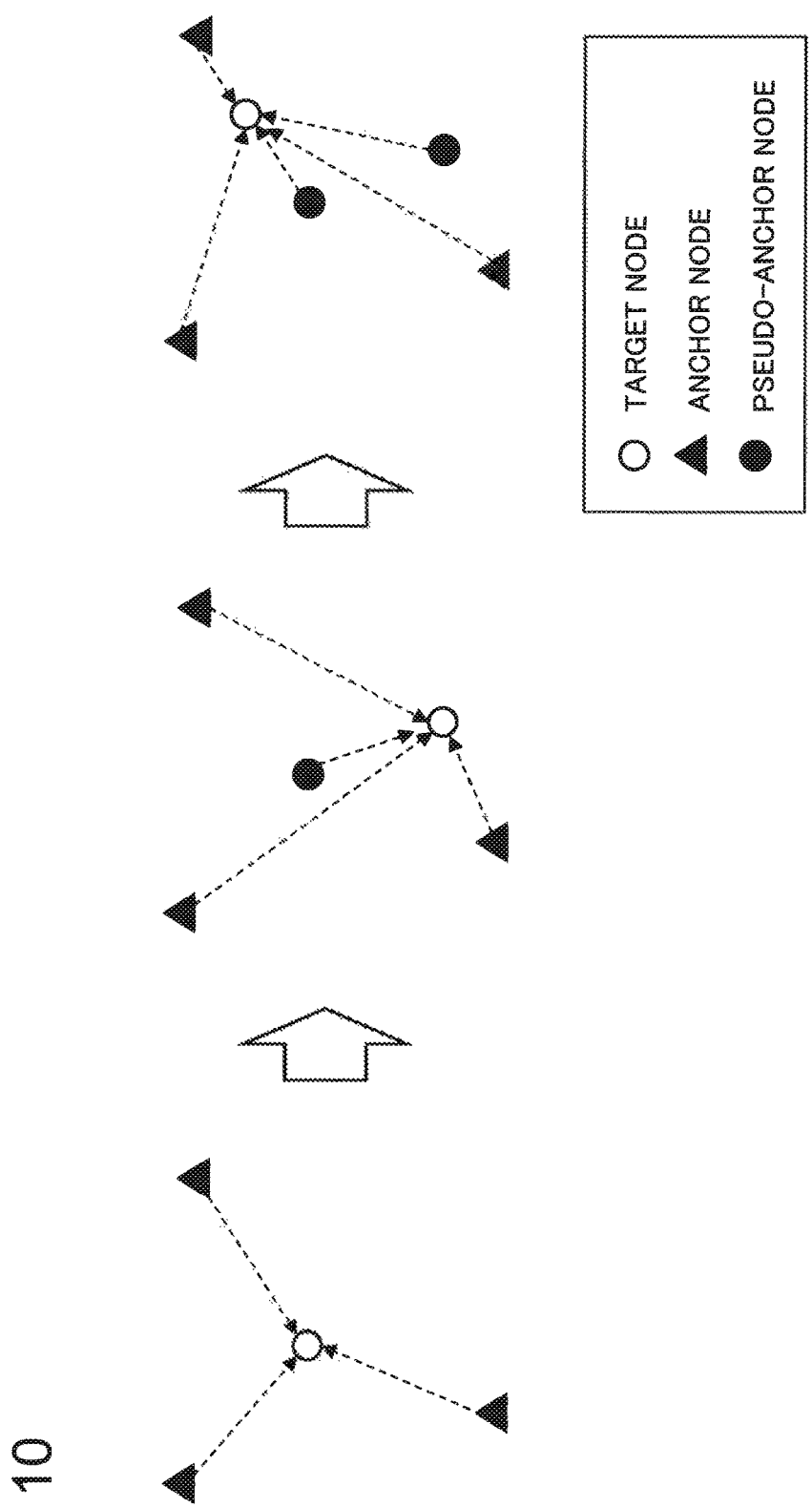
FIG. 10 is a diagram illustrating an example of addition of a pseudo-anchor node in position estimation.

Position estimation of a target node is performed by using inter-wireless-device distance information from anchor nodes and pseudo-anchor nodes, as in FIG. 10. Since a position-estimated target node becomes available as a pseudo-anchor node in a subsequent position estimation process, the number of pseudo-anchor nodes used for estimating a target node gradually increases.

For position estimation of a target node, a least squares method is used. An evaluation function E(t) of the least squares method is represented by the following expression.

$$E(\vec{t}) = \sum_i \left( |\vec{t} - \vec{a_i}| - d_i \right)^2$$
[Math. 6]

Herein, t indicates a position vector of a target node, and $a_i$ indicates a position vector of an anchor node or a pseudo-anchor node to which inter-wireless-device distance information with respect to the target node is given. $d_i$ indicates an inter-wireless-device distance associated with the anchor node or the pseudo-anchor node and updated by the inter-wireless-device distance update section 202. i indicates a number of the anchor node or the pseudo-anchor node.

In the least squares method, a position vector t of a target node where an evaluation function E(t) becomes minimum is obtained. In order to obtain such a position vector t of a target node, a gradient descent method is often used. In the gradient descent method, a vector $t_k$ is gradually brought close to a position vector t of a target node where an evaluation function E(t) becomes minimum, by repeating an operation by use of a recurrence relation as represented by the following expression.

$$\vec{t_k} = \vec{t_{k-1}} - \mu \cdot \frac{\partial E(\vec{t_{k-1}})}{\partial \vec{t}}$$
[Math. 7]

Herein, μ is a constant called a step size, and is used for controlling a convergence speed. The step size needs to be set to an appropriate value in accordance with estimation accuracy or a processing speed. In addition, the number of times of repetition also needs to be set to an appropriate number of times, similarly. Regarding the number of times of repetition, a method of setting a maximum number of times of repetition and quitting halfway when an absolute value of a derivative function of an evaluation function E(t) falls at or below a threshold value is often used.

In the least squares method, there is a case in which a solution where a value of an evaluation function becomes minimum is present at a position different from a correct solution, depending on a position of an anchor node, a pseudo-anchor node or the like. Such a solution is called a local solution. Using a method of solution of the least squares method using the gradient descent method may result in converging to such a local solution due to an initial value of a position vector, an influence of a measurement error or the like.

In order to reduce a probability of converging to a local solution and reduce the number of times of repetition of the above recurrence relation, a position vector of a node at the shortest distance from a target node among anchor nodes or pseudo-anchor nodes is defined as an initial value $t_0$ of a position vector of the target node.

By repeatedly performing such a process on a position-unknown wireless device, positions of all position-unknown wireless devices are estimated except for a wireless device, a position of which cannot be estimated due to shortage of distance information.

<Position Estimation Sorting>

As described above, position estimation of a plurality of position-unknown wireless devices is performed in order one by one for the wireless devices. A position-estimated node is incorporated into pseudo-anchor nodes to be used for subsequent position estimation. Since wrong position estimation in the beginning causes a significant influence on subsequent position estimation, it is necessary to appropriately set order of wireless devices for which position estimation is performed.

Since there are a small number of pseudo-anchor nodes at the beginning, a position of a target node is estimated by using mainly anchor nodes. When a target node is close to a center of gravity of an anchor node, a local solution is less likely to occur. Thus, performing position estimation in an ascending order of distance to a center of gravity of an anchor node reduces an average position estimation error.

However, since a position of each wireless device is not known before position estimation, it is not easy to correctly rearrange in an ascending order of distance to a center of gravity of an anchor node.

In view of the above, either one out of the following two methods is used.

Sorting method 1: Estimation is performed in order from a node having a small difference between maximum and minimum distances between a target node and an anchor node.

Sorting method 2: Estimation is performed in order from a node having a small average distance between a target node and an anchor node.

Since the both two methods described above have an exceptional case depending on a placement of a wireless device, it cannot be said that which one of the methods is better. However, carrying out either one of the above sorting methods can reduce an average estimation error compared with a case of not carrying out sorting.

<Selection of Estimation Result>

Figure 11:
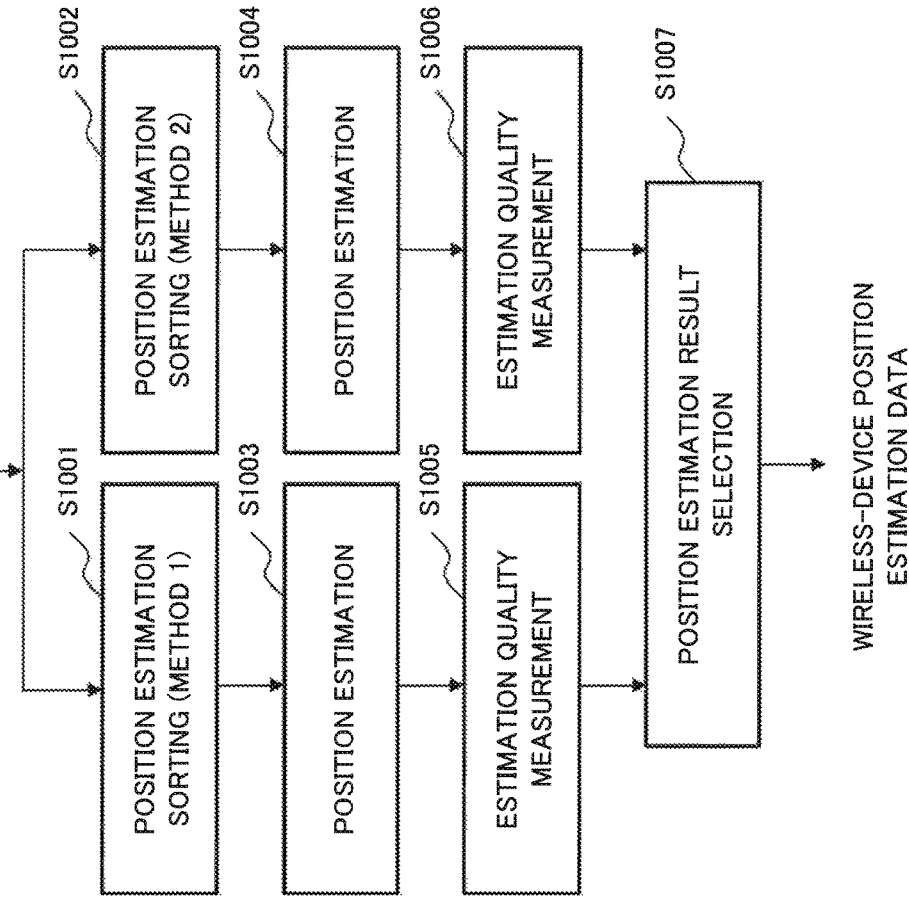
FIG. 11 is a flowchart describing a flow of selection processing of a position estimation result.

As described above, there are two position estimation sorting methods, and which one of the methods is better is not known before position estimation. In view of the above, the both sorting methods are used to perform position estimation, estimation quality is evaluated, and a position estimation value with higher estimation quality is selected. FIG. 11 illustrates a flow of selection of an estimation result.

First, position estimation sorting of Method 1 is performed, position estimation is performed, and estimation quality thereof is measured (Steps S1001, S1003, and S1005). Next, position estimation sorting of Method 2 is performed, position estimation is performed, and estimation quality thereof is measured (Steps S1002, S1004, and S1006). Finally, the estimation qualities using the above two methods are compared with each other, and a position estimation result with higher quality is selected (Step S1007).

For an evaluation function E for estimation quality, the following expression is used.

$$E = \sum_{i>j} \left( |\vec{t}_i - \vec{t}_j| - d_{ij} \right)^2 \quad \text{[Math. 8]}$$

Herein, $t_i$ indicates an estimation value of a position vector of an i-th wireless device (in a case of an anchor node, a position vector thereof), and $t_j$ indicates an estimation value of a position vector of a j-th wireless device (in a case of an anchor node, a position vector thereof). $d_{ij}$ indicates a distance between an i-th wireless device and a j-th wireless device. A smaller value of the evaluation function E indicates higher quality.

Next, a specific example of a method of weighting correction of a wireless-device position in the weighting correction section 204 of the position estimation apparatus 20 will be described.

<Weighting Correction Process>

The weighting correction section 204 corrects, based on reliability of an inter-wireless-device distance, a wireless-device position obtained by the wireless-device position estimation section 203, and also obtains reliability of the corrected wireless-device position at the same time.

Figure 12:
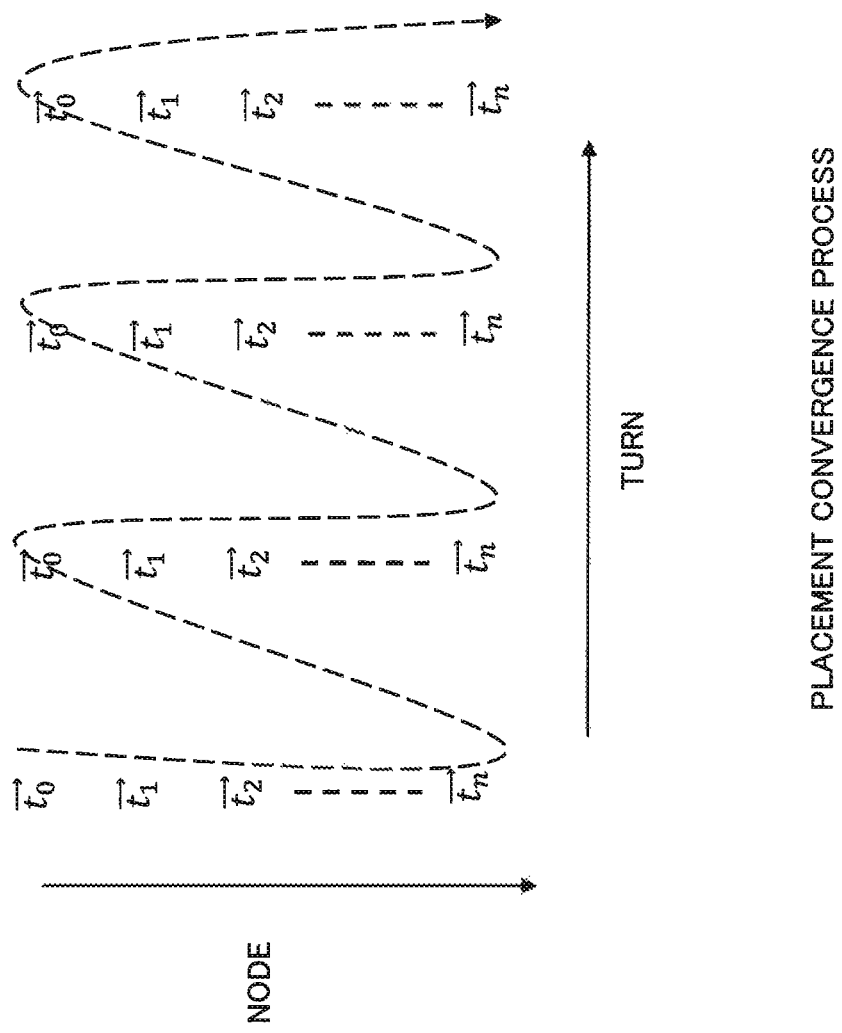
FIG. 12 is a diagram illustrating an example of a placement convergence process in a weighting correction process.

As in FIG. 12, a weighting correction process is carried out on a node except for an anchor node, and the process is repeated by the number of times set in advance. This repetition of a weighting correction process on all nodes to be targets is performed in order to cause placement variation to converge gradually, since performing weighting correction causes a position displacement of a corrected node, which affects weighting correction of other nodes. The number of times of repetition is obtained for each system empirically from a convergence status thereof.

Figure 13:
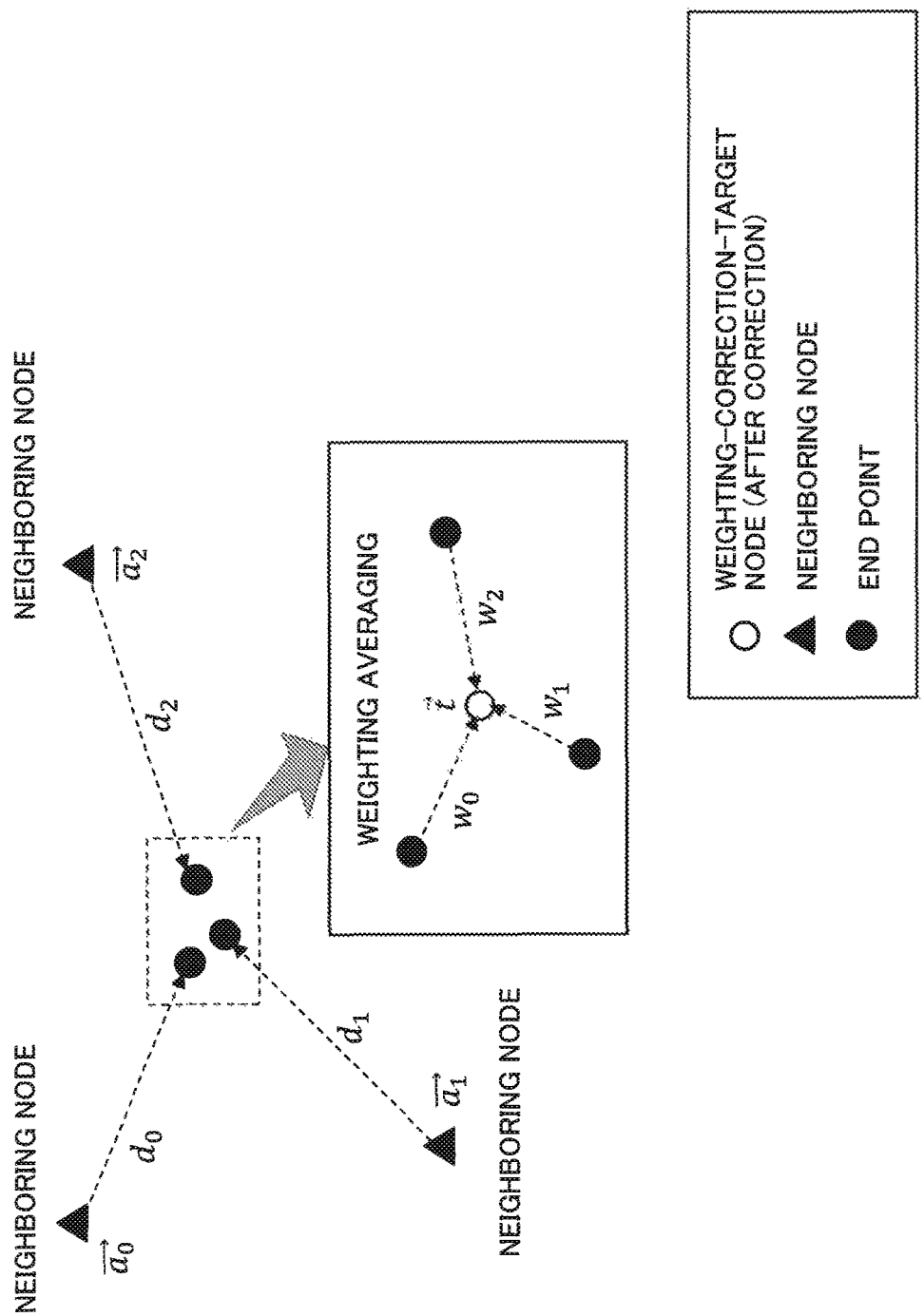
FIG. 13 is a diagram illustrating an example of a weighting averaging process in a weighting correction process.

As in FIG. 13, the weighting correction obtains a vector extending from a neighboring node of a weighting-correction-target node toward the weighting-correction-target node and having a corresponding inter-wireless-device distance. Further, the weighting correction obtains a position vector of an end point of the vector and reliability thereof, and obtains by performing weighting addition to position vectors of a plurality of the end points and reliabilities. In addition, at the same time, reliability of the position vector of the weighting-correction-target node is also obtained from the reliabilities of the position vectors of the plurality of end points.

Herein, it is assumed that a neighboring node indicates a node that has a known inter-wireless-device distance with respect to a weighting-correction-target node and known reliability of an own position vector.

In a first weighting correction process at a first turn in a placement convergence process, there are only anchor nodes having known reliabilities of position vectors. As weighting correction processes are progressed, there are gradually more and more nodes having known reliabilities of position vectors. At a second turn, reliabilities of position vectors are obtained for most of nodes.

An expression of a weighting correction process is indicated below.

$$w_i = \frac{1}{\delta a_i^2 + \delta d_i^2} \quad \text{[Math. 9]}$$

$$\vec{t}_{new} = \frac{1}{\Sigma_i w_i} \cdot \sum_i w_i \cdot \left( \vec{a}_i + \frac{\vec{t} - \vec{a}_i}{|\vec{t} - \vec{a}_i|} \cdot d_i \right)$$

$$\delta t_{new} = \sqrt{\frac{N}{\Sigma_i w_i}}$$

Herein, it is assumed that $t_{new}$ is a position vector of a weighting-corrected-target node, $\delta t_{new}$ is a standard deviation of a position vector of a weighting-corrected-target node, and t is a position vector of a weighting-correction-target node. It is assumed that $a_i$ is a position vector of a neighboring node, $\delta a_i$ is a standard deviation of a position vector $a_i$ of a neighboring node, $d_i$ is a measurement distance, $\delta d_i$ is a standard deviation of a measurement distance $d_i$, and N is the number of neighboring nodes. Herein, a standard deviation of a position vector of a weighting-corrected-target node is a scalar quantity, and indicates reliability of the position vector of the weighting-corrected-target node. A standard deviation of a position vector of a neighboring node is a scalar quantity, and indicates reliability of the position vector of the neighboring node. A standard deviation of a position vector is represented by a square root of a sum of all components of variance calculated for each component constituting a position vector.

Next, a specific example of a method of geometric correction of a wireless-device position in the geometric correction section 205 of the position estimation apparatus 20 will be described.

<Geometric Correction Process>

As described above, the geometric correction section 205 carries out geometric correction by using position information of a position-known wireless device, in order to reduce a rotation error or a surface error remaining at an estimated position of a wireless device weighting-corrected by the weighting correction section 204.

Figure 14:
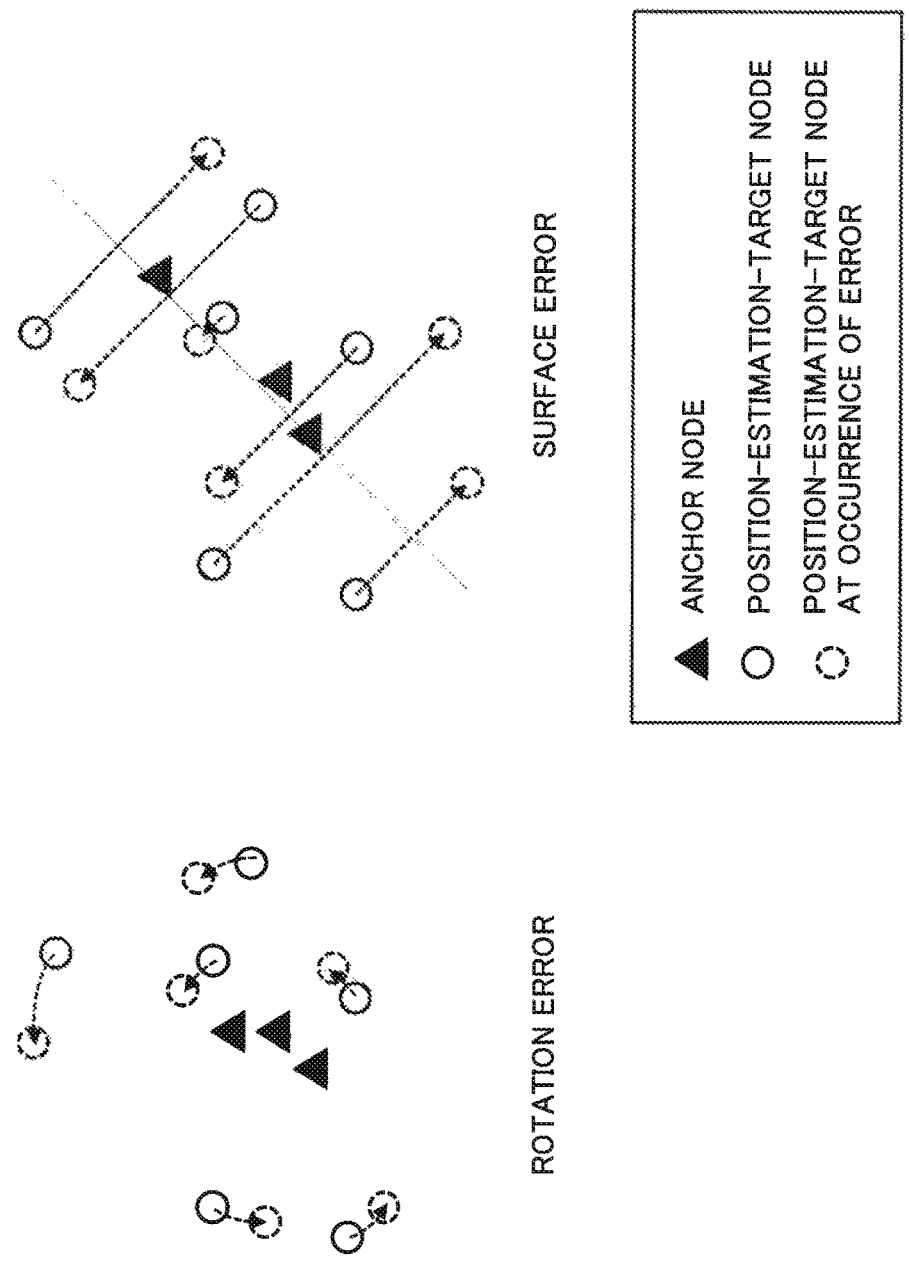
FIG. 14 is a diagram illustrating an example of a rotation error and a surface error.

Herein, a rotation error or a surface error means a collective displacement of position-estimation-target nodes relative to anchor nodes, as in FIG. 14. In a case of two-dimensional position estimation, a rotation error or a surface error occurs when the number of anchor nodes is two or greater, and in a case of three-dimensional position estimation, the number of anchor nodes is three or greater.

Figure 15:
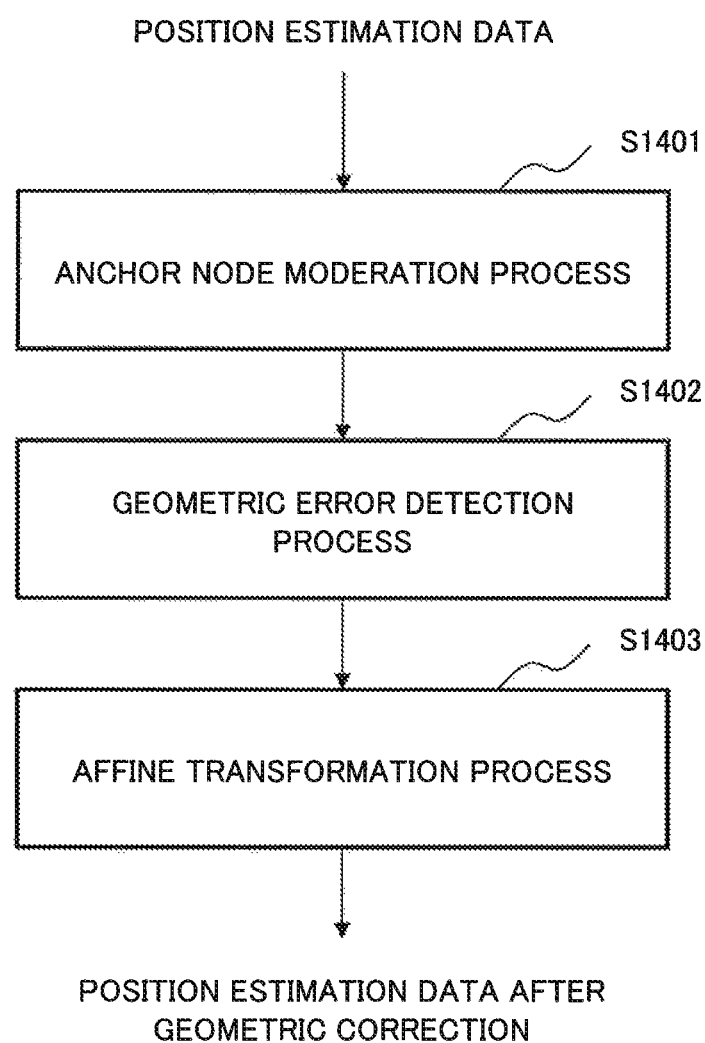
FIG. 15 is a flowchart describing a flow of a geometric correction process.

FIG. 15 illustrates a rough flow of a geometric correction process. First, a placement of an anchor node is moderated so as to meet a node weighting-corrected by the weighting correction section 204, by performing, on the anchor node, the same process as the above-described weighting correction process (Step S1401).

Next, the moderated anchor node placement is compared with a correct anchor node placement, and a geometric error amount is detected (Step S1402). Finally, in accordance with the geometric error amount, geometric correction of a position-estimation-target node is carried out by using affine transformation (Step S1403).

<Moderation Process of Anchor Node>

In a moderation process of an anchor node, the same process as the above-described weighting correction process is performed. A difference between the anchor node moderation process and the weighting correction process is that the weighting correction process carries out a correction process on only nodes (position-estimation-target nodes) except for anchor nodes, whereas the anchor node moderation process carries out a correction process on all nodes comprising anchor nodes.

Figure 16:
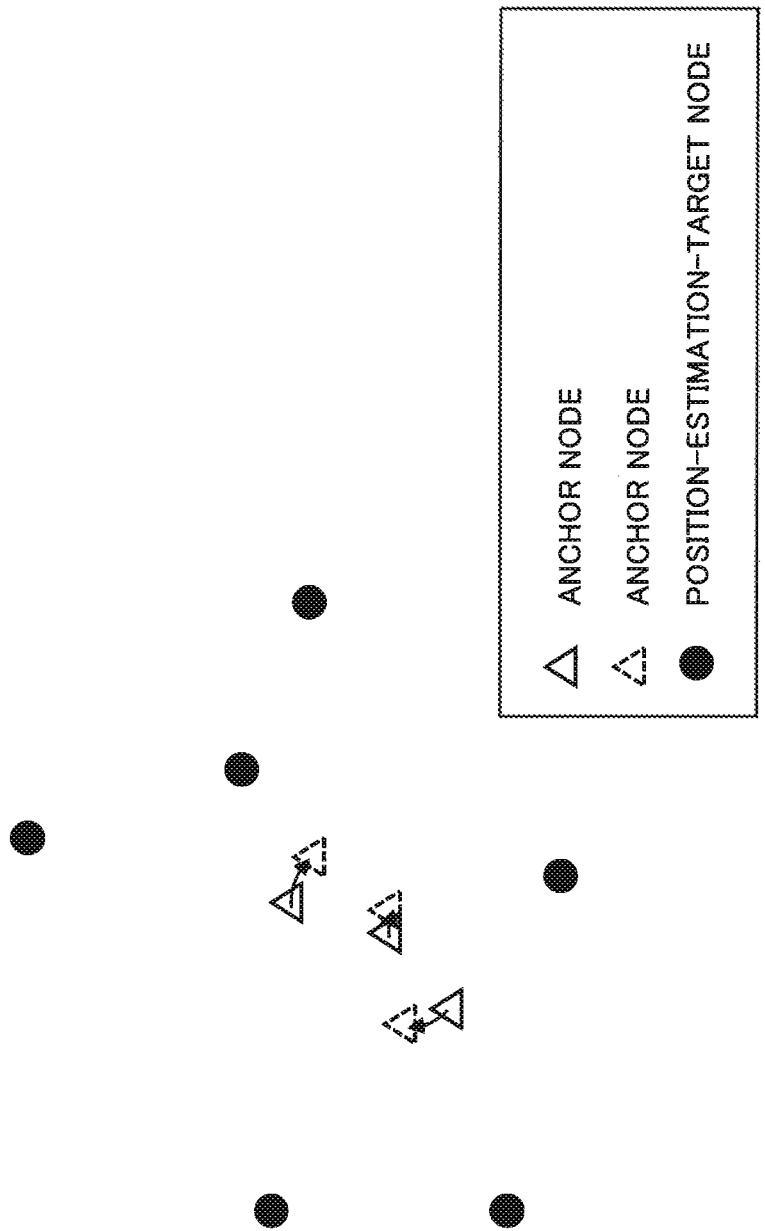
FIG. 16 is a diagram illustrating an example of displacement of an anchor node in an anchor node moderation process.

When a rotation error or a surface error remains at an estimated position of a weighting-corrected wireless device, performing an anchor node moderation process causes a position of an anchor node to converge to a position displaced from an original anchor node, as in FIG. 16. This displacement corresponds to a geometric error such as a remaining rotation error or surface error.

<Detection of Geometric Error>

A geometric error amount is calculated from a placement of an anchor node before and after moderation. For geometric correction, affine transformation of the following expression is used. A relationship of the following expression exists between a placement of an anchor node before moderation and a placement of an anchor node after moderation, under assumption of affine transformation comprising rotation and parallel translation. For each component constituting a position vector, the following general expression is assumed.

$$\vec{y_i} = (\vec{x_i} + \vec{r}) \cdot e^{j\vec{\theta}} \qquad \text{[Math. 10]}$$

Herein, $x_i$ indicates a position vector of each node after moderation, $y_i$ indicates a position vector of each node before moderation, r indicates a parallel translation vector, and θ indicates a rotation angle (in a case of three-dimensional position estimation, a two-dimensional vector).

As a geometric error amount, an affine transformation parameter (r, θ) described above is calculated. For calculation of an affine transformation parameter, the least squares method can be used.

An evaluation function E(r, θ) of the least squares method for calculating a geometric error amount is indicated below.

$$E(\vec{r}, \vec{\theta}) = \sum_i \left| (\vec{x_i} + \vec{r}) \cdot e^{j\vec{\theta}} - \vec{y_i} \right|^2 \qquad \text{[Math. 11]}$$

Herein, $x_i$ indicates a position vector of an anchor node after moderation, and $y_i$ indicates a position vector of an anchor node before moderation.

In the least squares method, the parameter (r, θ) where the above-described evaluation function E(r, θ) becomes minimum is calculated. As a method of calculating such a parameter, the gradient descent method used in the above-described position estimation can be used.

In the gradient descent method used for calculating an affine transformation parameter, vectors $r_k$, $\vec{\theta}_k$ are gradually brought close to the affine transformation parameter (r, θ) where the evaluation function E(r, θ) becomes minimum, by repeating an operation by use of a recurrence relation as represented by the following expression.

$$\vec{r_k} = \vec{r_{k-1}} - \mu_r \cdot \frac{\partial E(\vec{r_{k-1}})}{\partial \vec{r}} \qquad \text{[Math. 12]}$$

$$\vec{\theta_k} = \vec{\theta_{k-1}} - \mu_\theta \cdot \frac{\partial E(\vec{\theta_{k-1}})}{\partial \vec{\theta}}$$

Herein, $\mu_r$ indicates a step size for a parallel translation vector, and $\mu_\theta$ indicates a step size for a rotation angle. These constants are used for controlling a convergence speed.

<Affine Transformation Process>

Figure 17:
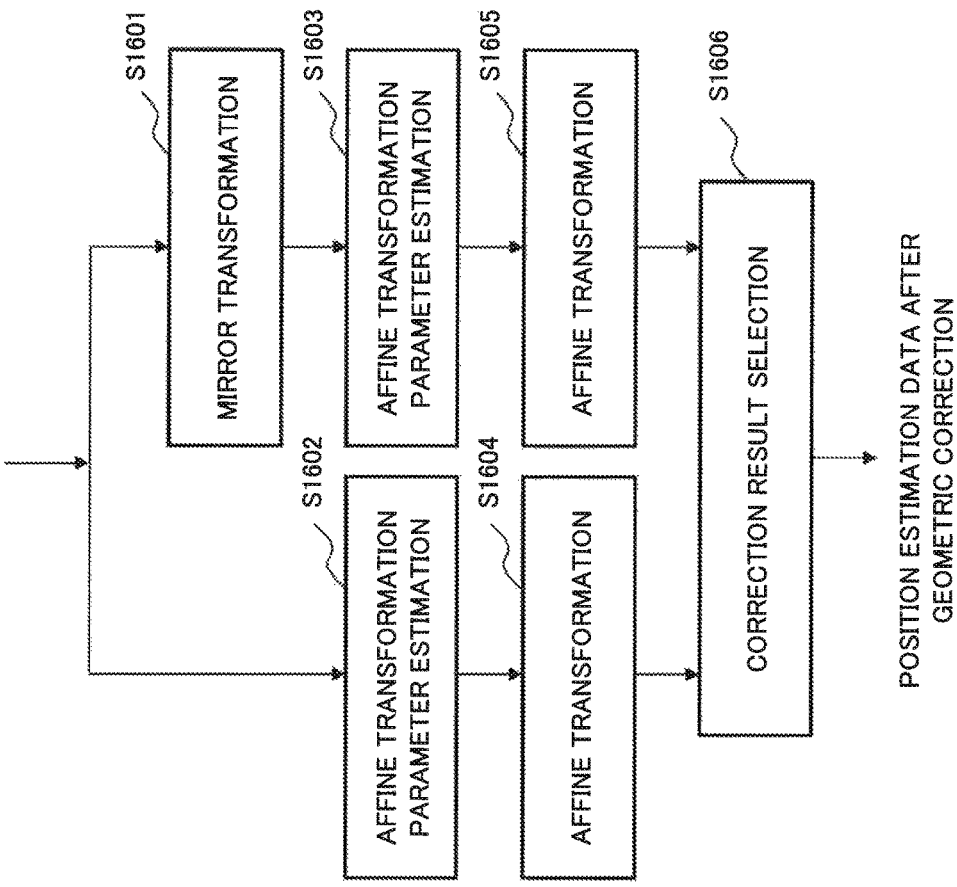
FIG. 17 is a flowchart describing a correction method of a surface error in a geometric correction process.

Geometric correction is performed by carrying out the above-described affine transformation on a position vector of a position-estimation-target node after an anchor node moderation process, by using an affine transformation parameter obtained in a geometric error detection process. However, since the affine transformation alone cannot correct a surface error, a method as illustrated in FIG. 17 is used.

First, an affine transformation parameter is estimated for a node placement after moderation as is, and affine transformation is performed (Steps S1602 and S1604). Next, an affine transformation parameter is also estimated in the same manner for a node placement that is mirror-transformed with respect to a node placement after moderation, and affine transformation is performed (Steps S1601, S1603, and S1605). Finally, correction results of the both are compared with each other, and a placement with a smaller error is selected (Step S1606).

Herein, the mirror transformation means mirror mapping with respect to a straight line passing near a center of gravity of an anchor node in a case of two-dimensional position estimation, and means mirror mapping with respect to a plane passing near a center of gravity of an anchor node in a case of three-dimensional position estimation.

In addition, in the selection of a correction result, a result having a smaller average distance between a position vector after affine transformation of an anchor node and an actual position vector of the anchor node is selected.

According to the method of the above-described specific example, a position of an unknown wireless device can be estimated based on position information of a position-known wireless device, and further, a geometric error such as a rotation error or a surface error remaining at the estimated unknown-wireless-device position can be corrected. Accordingly, highly accurate position estimation of a wireless device can be realized, for use in grasping a relative positional relationship through mutual wireless communication of wireless devices.

In the above, the preferred example embodiments and the specific examples of the present invention have been described. However, the present invention is not limited thereto. Various modifications can be made within the scope of the claimed invention. It is needless to say that such modifications are included in the scope of the present invention.

A part or all of the above-described example embodiments can be described as the following Supplementary notes, but are not limited to the followings.

(Supplementary Note 1)

A position estimation apparatus comprising: a data collection means for collecting measurement data related to an inter-device distance measured by one wireless device between the one wireless device and another wireless device, and related to reliability of the inter-device distance to the another wireless device, calculated by the one wireless device; and a wireless-device position estimation means for estimating a position of a position-unknown wireless device, based on measurement data collected by the data collection means, and previously collected measurement data related to a measured inter-device distance between one wireless device and another wireless device and related to reliability of the inter-device distance.

(Supplementary Note 2)

The position estimation apparatus according to Supplementary note 1, wherein the inter-device distance of the measurement data is measured by the one wireless device transmitting and receiving a radio signal to and from the another wireless device.

(Supplementary Note 3)

The position estimation apparatus according to Supplementary note 1 or 2, wherein reliability of the inter-device distance of the measurement data is calculated based on reception quality of the radio signal used in measurement of the inter-device distance.

(Supplementary Note 4)

A position estimation apparatus comprising: an inter-wireless-device distance update means for collecting measurement data related to an inter-device distance measured by one wireless device between the one wireless device and another wireless device, and related to reliability of the inter-device distance to the another wireless device, calculated by the one wireless device, and updating an accumulated inter-device distance and reliability of the inter-device distance; and a wireless-device position estimation means for estimating a position of a position-unknown wireless device, based on measurement data collected by the inter-wireless-device distance update means, and previously collected measurement data related to a measured inter-device distance between one wireless device and another wireless device and related to reliability of the inter-device distance.

(Supplementary Note 5)

The position estimation apparatus according to Supplementary note 4, wherein the wireless-device position estimation means sorts order of a wireless device to be position-estimated, based on a distance between the wireless device and a position-known wireless device.

(Supplementary Note 6)

The position estimation apparatus according to Supplementary note 5, wherein, as the sorting method, estimation is performed in order from a wireless device having a smallest difference between maximum and minimum distances to a position-known wireless device.

(Supplementary Note 7)

The position estimation apparatus according to Supplementary note 5, wherein, as the sorting method, estimation is performed in order from a wireless device having a smallest average distance to a position-known wireless device.

(Supplementary Note 8)

The position estimation apparatus according to Supplementary note 5, wherein, as the sorting method, a plurality of sorting methods are used for sorting, and an estimation result having a highest evaluation value is selected from a result of position estimation.

(Supplementary Note 9)

The position estimation apparatus according to Supplementary note 8, wherein, as the evaluation value, a smaller result obtained by adding a squared difference between a distance between a position of a position-known wireless device and an estimated position of the wireless device, and the measured inter-device distance, to all position-known wireless devices is defined as having a higher evaluation value.

(Supplementary Note 10)

The position estimation apparatus according to any one of Supplementary notes 4 to 9, further comprising a weighting correction means for correcting the estimated unknown-wireless-device position, by using the updated inter-device distance and the updated reliability of the inter-device distance.

(Supplementary Note 11)

The position estimation apparatus according to Supplementary note 10, wherein the weighting correction means repeats, a plurality of times, carrying out weighting correction in order on wireless devices except for a position-known wireless device, and, after completion of a series of weighting correction on a wireless device to be a target, again carrying out weighting correction in order from a wireless device to be a first target.

(Supplementary Note 12)

The position estimation apparatus according to Supplementary note 11, wherein the weighting correction is obtained by obtaining a vector extending from a neighboring node of a weighting-correction-target node toward the weighting-correction-target node and having a corresponding inter-wireless-device distance, by obtaining a position vector of an end point of the vector and reliability thereof, and by performing weighting addition to position vectors of a plurality of the end points and reliability.

(Supplementary Note 13)

The position estimation apparatus according to any one of Supplementary notes 10 to 12, further comprising a geometric correction means for correcting a geometric error remaining at the corrected unknown-wireless-device position, by using position information of an absolute-position-known wireless device among the wireless devices, the updated inter-device distance, and the updated reliability of the inter-device distance.

(Supplementary Note 14)

The position estimation apparatus according to Supplementary note 13, wherein the geometric correction means calculates a pseudo position of a position-known wireless device by carrying out weighting correction on a position of the position-known wireless device, obtains a geometric error amount by comparing the calculated position with an actual position of the position-known wireless device, and performs geometric correction on a position of a position-unknown wireless device in accordance with the geometric error amount.

(Supplementary Note 15)

The position estimation apparatus according to Supplementary note 14, wherein, in calculation of the geometric error amount, a geometric correction parameter is obtained, the geometric correction parameter minimizing a sum of a squared difference between a geometric-correction-performed position of a position-known wireless device on which weighting correction is carried out, and an actual position of the position-known wireless device.

(Supplementary Note 16)

The position estimation apparatus according to Supplementary note 14, wherein, in the geometric correction, a pseudo position of a position-known wireless device is calculated by carrying out weighting correction also on a position of the position-known wireless device on which mirror transformation is performed, a geometric error amount is obtained by comparing the calculated position with an actual position of the position-known wireless device, geometric correction is performed on a position of a position-unknown wireless device in accordance with the geometric error amount, a geometric correction result is compared between a position without mirror transformation and a position with mirror transformation, and a placement with a smaller error is selected.

(Supplementary Note 17)

The position estimation apparatus according to Supplementary note 16, wherein, in comparison of the geometric correction result, a result having a smaller average distance between a position as a result of geometric correction of a position-known wireless device and an actual position of the position-known wireless device is selected.

(Supplementary Note 18)

The position estimation apparatus according to any one of Supplementary notes 13 to 17, wherein the geometric correction means corrects a rotation error or a surface error remaining at a relative position or an absolute position of each of the corrected wireless devices.

(Supplementary Note 19)

A position estimation system comprising: a plurality of wireless devices for measuring an inter-device distance between a wireless device and another wireless device by transmitting and receiving a radio signal to and from each other, calculating, based on reception quality of the radio signal used in measurement of the inter-device distance, reliability of the inter-device distance, and outputting the measured inter-device distance and the calculated reliability of the inter-device distance at a predetermined cycle; and a position estimation apparatus for collecting the measured inter-device distance and the calculated reliability of the inter-device distance from the plurality of wireless devices, calculating a device relative position of each of the wireless devices, and outputting a device-position estimation result, wherein the position estimation apparatus comprises: an inter-wireless-device distance update means for collecting measurement data related to a measured inter-device distance between a wireless device and another wireless device and related to reliability of the inter-device distance, and updating an accumulated inter-device distance and reliability of the inter-device distance; and a wireless-device position estimation means for estimating a position of a position-unknown wireless device, based on measurement data collected by the inter-wireless-device distance update means, and previously collected measurement data related to a measured inter-device distance between a wireless device and another wireless device and related to reliability of the inter-device distance.

(Supplementary Note 20)

The position estimation system according to Supplementary note 19, wherein the position estimation apparatus further comprises a weighting correction means for correcting the estimated unknown-wireless-device position, by using the updated inter-device distance and the updated reliability of the inter-device distance.

(Supplementary Note 21)

The position estimation system according to Supplementary note 20, wherein the position estimation apparatus further comprises a geometric correction means for correcting a geometric error remaining at the corrected unknown-wireless-device position, by using position information of an absolute-position-known wireless device among the wireless devices, the updated inter-device distance, and the updated reliability of the inter-device distance.

(Supplementary Note 22)

A position estimation method comprising:

collecting measurement data related to a measured inter-device distance between a wireless device and another wireless device and related to reliability of the inter-device distance, and updating an accumulated inter-device distance and reliability of the inter-device distance; and estimating a position of a position-unknown wireless device, based on the collected measurement data, and previously collected measurement data related to a measured inter-device distance between a wireless device and another wireless device and related to reliability of the inter-device distance.

(Supplementary Note 23)

The position estimation method according to Supplementary note 22, wherein the estimated unknown-wireless-device position is corrected by using the updated inter-device distance and the updated reliability of the inter-device distance.

(Supplementary Note 24)

The position estimation method according to Supplementary note 23, wherein a geometric error remaining at the corrected unknown-wireless-device position is corrected by using position information of an absolute-position-known wireless device among the wireless devices, the updated inter-device distance, and the updated reliability of the inter-device distance.

(Supplementary Note 25)

A computer-readable recording medium for position estimation that records a position estimation program causing a processor to collect measurement data related to a measured inter-device distance between a wireless device and another wireless device and related to reliability of the inter-device distance, and execute updating processing on an accumulated inter-device distance and reliability of the inter-device distance, and to execute estimation processing on a position of a position-unknown wireless device, based on the collected measurement data, and previously collected measurement data related to a measured inter-device distance between a wireless device and another wireless device and related to reliability of the inter-device distance.

(Supplementary Note 26)

The recording medium for position estimation according to Supplementary note 25, further causing to execute correction processing on the estimated unknown-wireless-device position, by using the updated inter-device distance and the updated reliability of the inter-device distance.

(Supplementary Note 27)

The recording medium for position estimation according to Supplementary note 26, further causing to execute correction processing on a geometric error remaining at the corrected unknown-wireless-device position, by using position information of an absolute-position-known wireless device among the wireless devices, the updated inter-device distance, and the updated reliability of the inter-device distance.

The present invention has been described using each of the example embodiments described above as an exemplary example. However, the present invention is not limited to the above-described example embodiments. In other words, various modes that a person skilled in the art can understand can be applied to the present invention within the scope of the present invention.

This application is based upon and claims the benefit of priority from Japanese Patent Application No. 2015-19558, filed on Feb. 3, 2015, the disclosure of which is incorporated herein in its entirety by reference.

REFERENCE SIGNS LIST

1 Position estimation section
2 Data collection section
3 Wireless-device position estimation section
10 Position estimation system
11, 12, 13, 1n Wireless device
20 Position estimation apparatus
30 Wireless device
101 Inter-wireless-device distance update section
102 Wireless-device position estimation section
103 Weighting correction section
104 Geometric correction section
201 Inter-wireless-device distance measurement data collection section
202 Inter-wireless-device distance update section
203 Wireless-device position estimation section
204 Weighting correction section
205 Geometric correction section
401 Wireless circuit
402 Processor
403 Instruction memory
404 Shared memory
405 Data memory
501 Distance measurement data collection function means
502 Inter-wireless-device distance update function means
503 Wireless-device position estimation function means
504 Weighting correction function means
505 Geometric correction function means
601 Timing pulse signal generation circuit
602 Data modulation circuit
603 Transmission RF circuit
604 Delay measurement circuit
605 Data demodulation circuit
606 Reception RF circuit
607 Control circuit
608 Processor
701 Matched filter
702 Correlation coefficient generation circuit
703 Electric power arithmetic circuit
704 Peak detection circuit

The invention claimed is:

1. A position estimation apparatus comprising:
a data collection unit which collects measurement data related to an inter-device distance measured by one wireless device between the one wireless device and another wireless device, and related to reliability of the inter-device distance to the another wireless device, calculated by the one wireless device;
a wireless-device position estimation unit which estimates a position of a position-unknown wireless device, based on measurement data collected by the data collection unit, and previously collected measurement data related to a measured inter-device distance between one wireless device and another wireless device and related to reliability of the inter-device distance; and
a geometric correction unit for correcting a geometric error remaining at the corrected unknown-wireless-device position, by using position information of an absolute-position-known wireless device among the wireless devices, the updated inter-device distance, and the updated reliability of the inter-device distance.

2. A position estimation apparatus comprising:
an inter-wireless-device distance update unit which collects measurement data related to an inter-device distance measured by one wireless device between the one wireless device and another wireless device, and related to reliability of the inter-device distance to the another wireless device, calculated by the one wireless device, and updating an accumulated inter-device distance and reliability of the inter-device distance;
a wireless-device position estimation unit which estimates a position of a position-unknown wireless device, based on measurement data collected by the inter-wireless-device distance update unit, and previously collected measurement data related to a measured inter-device distance between one wireless device and another wireless device and related to reliability of the inter-device distance; and
a geometric correction unit for correcting a geometric error remaining at the corrected unknown-wireless-device position, by using position information of an absolute-position-known wireless device among the wireless devices, the updated inter-device distance, and the updated reliability of the inter-device distance.

3. The position estimation apparatus according to claim 2, wherein the wireless-device position estimation unit sorts order of a wireless device to be position-estimated, based on a distance between the wireless device and a position-known wireless device.

4. The position estimation apparatus according to claim 3, wherein, as the sorting method, estimation is performed in order from a wireless device having a smallest difference between maximum and minimum distances to a position-known wireless device.

5. The position estimation apparatus according to claim 3, wherein, as the sorting method, estimation is performed in order from a wireless device having a smallest average distance to a position-known wireless device.

6. The position estimation apparatus according to claim 2, further comprising a weighting correction unit for correcting the estimated unknown-wireless-device position, by using the updated inter-device distance and the updated reliability of the inter-device distance.

7. A position estimation system comprising:
a plurality of wireless devices for measuring an inter-device distance between a wireless device and another wireless device by transmitting and receiving a radio signal to and from each other, calculating, based on reception quality of the radio signal used in measurement of the inter-device distance, reliability of the inter-device distance, and outputting the measured inter-device distance and the calculated reliability of the inter-device distance at a predetermined cycle; and
a position estimation apparatus for collecting the measured inter-device distance and the calculated reliability of the inter-device distance from the plurality of wireless devices, calculating a device relative position of each of the wireless devices, and outputting a device-position estimation result, wherein
the position estimation apparatus comprises:
an inter-wireless-device distance update unit which collects measurement data related to a measured inter-device distance between a wireless device and another wireless device and related to reliability of the inter-device distance, and updating an accumulated inter-device distance and reliability of the inter-device distance; and
a wireless-device position estimation unit which estimates a position of a position-unknown wireless device, based on measurement data collected by the inter-wireless-device distance update unit and previously collected measurement data related to a measured inter-device distance between a wireless device and another wireless device and related to reliability of the inter-device distance,
wherein the position estimation apparatus further comprises a weighting correction unit which corrects the estimated unknown-wireless-device position, by using the updated inter-device distance and the updated reliability of the inter-device distance,
wherein the position estimation apparatus further comprises a geometric correction unit which corrects a geometric error remaining at the corrected unknown-wireless-device position, by using position information of an absolute-position-known wireless device among the wireless devices, the updated inter-device distance, and the updated reliability of the inter-device distance.

8. A position estimation method comprising:
collecting measurement data related to a measured inter-device distance between a wireless device and another wireless device and related to reliability of the inter-device distance, and updating an accumulated inter-device distance and reliability of the inter-device distance; and
estimating a position of a position-unknown wireless device, based on the collected measurement data, and previously collected measurement data related to a measured inter-device distance between a wireless device and another wireless device and related to reliability of the inter-device distance,
wherein the estimated unknown-wireless-device position is corrected by using the updated inter-device distance and the updated reliability of the inter-device distance,
wherein a geometric error remaining at the corrected unknown-wireless-device position is corrected by using position information of an absolute-position-known wireless device among the wireless devices, the updated inter-device distance, and the updated reliability of the inter-device distance.

9. A non-transitory computer-readable recording medium for position estimation that records a position estimation program causing a processor to:
collect measurement data related to a measured inter-device distance between a wireless device and another wireless device and related to reliability of the inter-device distance, and execute updating processing on an accumulated inter-device distance and reliability of the inter-device distance,
execute estimation processing on a position of a position-unknown wireless device, based on the collected measurement data, and previously collected measurement data related to a measured inter-device distance between a wireless device and another wireless device and related to reliability of the inter-device distance,
execute correction processing on the estimated unknown-wireless-device position, by using updated inter-device distance and updated reliability of the inter-device distance, and
execute correction processing on a geometric error remaining at corrected unknown-wireless-device position, by using position information of an absolute-position-known wireless device among the wireless devices, the updated inter-device distance, and the updated reliability of the inter-device distance.

* * * * *